(12) United States Patent
Maeno

(10) Patent No.: US 7,397,802 B2
(45) Date of Patent: Jul. 8, 2008

(54) COMMUNICATIONS NETWORK WITH ROUTING TABLES FOR ESTABLISHING A PATH WITHOUT FAILURE BY AVOIDING UNREACHABLE NODES

(75) Inventor: Yoshiharu Maeno, Tokyo (JP)

(73) Assignee: NEC Corporation, Tokyo (JP)

( * ) Notice: Subject to any disclaimer, the term of this patent is extended or adjusted under 35 U.S.C. 154(b) by 1082 days.

(21) Appl. No.: 10/196,985

(22) Filed: Jul. 18, 2002

(65) Prior Publication Data

US 2003/0016678 A1 Jan. 23, 2003

(30) Foreign Application Priority Data

Jul. 19, 2001 (JP) ............................ 2001-218903
Dec. 28, 2001 (JP) ............................ 2001-398723

(51) Int. Cl.
*H04L 12/28* (2006.01)
(52) U.S. Cl. ................................. 370/395.31
(58) Field of Classification Search ............ 370/395.31, 370/389, 390
See application file for complete search history.

(56) References Cited

U.S. PATENT DOCUMENTS

| | | | | |
|---|---|---|---|---|
| 5,181,134 A | * | 1/1993 | Fatehi et al. ................... | 398/56 |
| 6,078,590 A | * | 6/2000 | Farinacci et al. ............ | 370/432 |
| 6,535,507 B1 | * | 3/2003 | Li et al. ....................... | 370/356 |
| 6,587,462 B2 | * | 7/2003 | Mahalingaiah ............... | 370/389 |
| 6,711,152 B1 | * | 3/2004 | Kalmanek et al. ........... | 370/351 |
| 6,765,908 B1 | * | 7/2004 | Chen .......................... | 370/392 |
| 6,857,026 B1 | * | 2/2005 | Cain .......................... | 709/239 |

FOREIGN PATENT DOCUMENTS

EP 1011241 A1 * 6/2000

* cited by examiner

*Primary Examiner*—Hassan Kizou
*Assistant Examiner*—Bo Hui Zhu
(74) *Attorney, Agent, or Firm*—McGinn IP Law Group, PLLC

(57) ABSTRACT

In a communications network where cross-connect nodes are organized according to geographic domains, a domain connectivity table indicates intra-domain connectivity of each domain and a domain routing table indicates a route specifying those nodes whose intra-domain connectivity is indicated in the domain connectivity table. Each node uses its domain routing table to establish a path between edge nodes. In another embodiment, the domain routing table indicates routes containing no intra-domain virtual link that terminates at an edge node and no consecutively concatenated intra-domain virtual links. A backbone routing table indicates inter-domain routes and unreachability indications between border nodes of each domain and border nodes of every other domain. The inter-domain routes contain at least one of the inter-domain physical links but contain no consecutively concatenated intra-domain virtual links.

34 Claims, 29 Drawing Sheets

FIG. 3

INTER-DOMAIN CONNECTIVITY TABLE OF DOMAIN 1 — IDCT1

| LINK | HOME NTWK NODE | BORDER/CLIENT NODE |
|---|---|---|
| I | 11 | 51 |
| F | 13 | 21 |
| G | 14 | 22 |

INTER-DOMAIN CONNECTIVITY TABLE OF DOMAIN 2 — IDCT2

| LINK | HOME NTWK NODE | BORDER NTWK NODE |
|---|---|---|
| A | 23 | 41 |
| F | 21 | 13 |
| G | 22 | 14 |
| H | 24 | 33 |

INTER-DOMAIN CONNECTIVITY TABLE OF DOMAIN 3 — IDCT3

| LINK | HOME NTWK NODE | BORDER NTWK NODE |
|---|---|---|
| B | 33 | 42 |
| D | 34 | 44 |
| H | 33 | 24 |

INTER-DOMAIN CONNECTIVITY TABLE OF DOMAIN 4 — IDCT4

| LINKS | HOME NTWK NODE | BORDER/CLIENT NODE |
|---|---|---|
| A | 41 | 23 |
| B | 42 | 33 |
| C | 43 | 61 |
| D | 44 | 34 |
| E | 44 | 62 |

FIG. 4

DOMAIN CONNECTIVITY TABLE OF DOMAIN 1    DCT1

|       | NN 11 | NN 12 | NN 13 | NN 14 |
|-------|-------|-------|-------|-------|
| NN 11 | –     | O     | O     | O     |
| NN 12 | O     | –     | O     | O     |
| NN 13 | O     | O     | –     | O     |
| NN 14 | O     | O     | O     | –     |

O: AVAILABLE

DOMAIN CONNECTIVITY TABLE OF DOMAIN 2    DCT2

|       | NN 21 | NN 22 | NN 23 | NN 24 |
|-------|-------|-------|-------|-------|
| NN 21 | –     | O     | O     | X     |
| NN 22 | O     | –     | O     | O     |
| NN 23 | O     | O     | –     | O     |
| NN 24 | X     | O     | O     | –     |

O: AVAILABLE    X: UNAVAILABLE

DOMAIN CONNECTIVITY TABLE OF DOMAIN 3    DCT3

|       | NN 31 | NN 32 | NN 33 | NN 34 |
|-------|-------|-------|-------|-------|
| NN 31 | –     | O     | O     | X     |
| NN 32 | O     | –     | X     | O     |
| NN 33 | O     | X     | –     | O     |
| NN 34 | X     | O     | O     | –     |

DOMAIN CONNECTIVITY TABLE OF DOMAIN 4    DCT4

|       | NN 41 | NN 42 | NN 43 | NN 44 |
|-------|-------|-------|-------|-------|
| NN 41 | –     | O     | O     | X     |
| NN 42 | O     | –     | O     | O     |
| NN 43 | O     | O     | –     | O     |
| NN 44 | X     | O     | O     | –     |

FIG. 6A

INTER-DOMAIN CONNECTIVITY TABLE OF DOMAIN 4 — IDCT4

| LINKS | HOME NTWK NODE | BORDER/ CLIENT NODES |
|---|---|---|
| A | 41 | 23 |
| B | 42 | 33 |
| C | 43 | 61 |
| D | 44 | 34 |
| E | 44 | 62 |

DOMAIN CONNECTIVITY TABLE OF DOMAIN 4 — DCT4

|  | NN 41 | NN 42 | NN 43 | NN 44 |
|---|---|---|---|---|
| NN 41 | – | O | O | X |
| NN 42 | O | – | O | O |
| NN 43 | O | O | – | O |
| NN 44 | X | O | O | – |

O: AVAILABLE  X: UNAVAILABLE

DOMAIN ROUTING TABLE OF DOMAIN 4 (= LSA-1) — DRT4

| CLIENT NODE | OUTGOING BORDER NODE | TRANSIT DOMAIN | INCOMING BORDER NODES |
|---|---|---|---|
| 61 | 43 | 4 | 41, 42, 44 |
| 62 | 44 | 4 | 42, 43, 44 |

FIG. 6B

LSA-1 SENT FROM DOMAIN 4

| CLIENT NODE | TRANSIT DOMAINS | INCOMING BORDER NODES |
|---|---|---|
| 61 | 4 | 41, 42, 44 |
| 62 | 4 | 42, 43, 44 |

INTER-DOMAIN CONNECTIVITY TABLE OF DOMAIN 2 — IDCT2

| LINKS | HOME NTWK NODES | BORDER NTWK NODES |
|---|---|---|
| A | 23 | 41 |
| F | 21 | 13 |
| G | 22 | 14 |
| H | 24 | 33 |

DOMAIN CONNECTIVITY TABLE OF DOMAIN 2 — DCT2

|  | NN 21 | NN 22 | NN 23 | NN 24 |
|---|---|---|---|---|
| NN 21 | − | O | O | X |
| NN 22 | O | − | O | O |
| NN 23 | O | O | − | O |
| NN 24 | X | O | O | − |

DOMAIN ROUTING TABLE OF DOMAIN 2
CREATED IN RESPONSE TO LSA-1 — DRT2

| CLIENT NODE | OUTGOING BORDER NODE | TRANSIT DOMAINS | INCOMING BORDER NODES |
|---|---|---|---|
| 61 | 23 | 2 − 4 | 21, 22, 24 |

FIG. 6C

LSA-1 SENT FROM DOMAIN 4

| CLIENT NODE | TRANSIT DOMAINS | INCOMING BORDER NODES |
|---|---|---|
| 61 | 4 | 41, 42, 44 |
| 62 | 4 | 42, 43, 44 |

INTER-DOMAIN CONNECTIVITY TABLE OF DOMAIN 3 — IDCT3

| LINKS | HOME NTWK NODES | BORDER NTWK NODES |
|---|---|---|
| B | 33 | 42 |
| D | 34 | 44 |
| H | 33 | 24 |

DOMAIN CONNECTIVITY TABLE OF DOMAIN 3 — DCT3

|  | NN 31 | NN 32 | NN 33 | NN 34 |
|---|---|---|---|---|
| NN 31 | – | O | O | X |
| NN 32 | O | – | X | O |
| NN 33 | O | X | – | O |
| NN 34 | X | O | O | – |

DOMAIN ROUTING TABLE OF DOMAIN 3 CREATED IN RESPONSE TO LSA-1 — DRT3

| | CLIENT NODE | OUTGOING BORDER NODE | TRANSIT DOMAINS | INCOMING BORDER NODES |
|---|---|---|---|---|
| 601 | 61 | 33 | 3 - 4 | 33, 34 |
| 602 | 61 | 34 | 3 - 4 | 33 |
| 603 | 62 | 33 | 3 - 4 | 33, 34 |
| 604 | 62 | 34 | 3 - 4 | 33 |

FIG. 6D

LSA-2B SENT FROM DOMAIN 3

| CLIENT NODE | TRANSIT DOMAINS | INCOMING BORDER NODES |
|---|---|---|
| 61 | 3 - 4 | 33, 34 |
| 61 | 3 - 4 | 33 |
| 62 | 3 - 4 | 33, 34 |
| 62 | 3 - 4 | 33 |

INTER-DOMAIN CONNECTIVITY
TABLE OF DOMAIN 2     IDCT2

| LINKS | HOME NODES | BORDER NODES |
|---|---|---|
| A | 23 | 41 |
| F | 21 | 13 |
| G | 22 | 14 |
| H | 24 | 33 |

DOMAIN CONNECTIVITY TABLE OF DOMAIN 2     DCT2

|  | NN 21 | NN 22 | NN 23 | NN 24 |
|---|---|---|---|---|
| NN 21 | – | O | O | X |
| NN 22 | O | – | O | O |
| NN 23 | O | O | – | O |
| NN 24 | X | O | O | – |

DOMAIN ROUTING TABLE OF DOMAIN 2
UPDATED IN RESPONSE TO LSA-2B     DRT2

| CLIENT NODE | OUTGOING BORDER NODE | TRANSIT DOMAINS | INCOMING BORDER NODES |
|---|---|---|---|
| 61 | 23 | 2 - 4 | 21, 22, 24 |
| 62 | 24 | 2 - 3 - 4 | 22, 23 |

FIG. 6E

LSA-3 SENT FROM DOMAIN 2

| CLIENT NODE | TRANSIT DOMAINS | INCOMING BORDER NODES |
|---|---|---|
| 61 | 2 - 4 | 21, 22, 24 |
| 62 | 2 - 3 -- 4 | 22, 23 |

INTER-DOMAIN CONNECTIVITY TABLE OF DOMAIN 1 IDCT1

| LINKS | HOME NODES | BORDER NODES |
|---|---|---|
| I | 11 | 51 |
| F | 13 | 21 |
| G | 14 | 22 |

DOMAIN CONNECTIVITY TABLE OF DOMAIN 1 DCT1

|  | NN 11 | NN 12 | NN 13 | NN 14 |
|---|---|---|---|---|
| NN 11 | – | O | O | O |
| NN 12 | O | – | O | O |
| NN 13 | O | O | – | O |
| NN 14 | O | O | O | – |

DOMAIN ROUTING TABLE OF DOMAIN 1 CREATED IN RESPONSE TO LSA-3 DRT1

| CLIENT NODE | OUTGOING BORDER NODE | TRANSIT DOMAINS | INCOMING NODES |
|---|---|---|---|
| 61 | 13 | 1 - 2 - 4 | 11, 14 |
| 61 | 14 | 1 - 2 - 4 | 11, 13 |
| 62 | 14 | 1 - 2 - 3 -- 4 | 11, 13 |

611
612
613

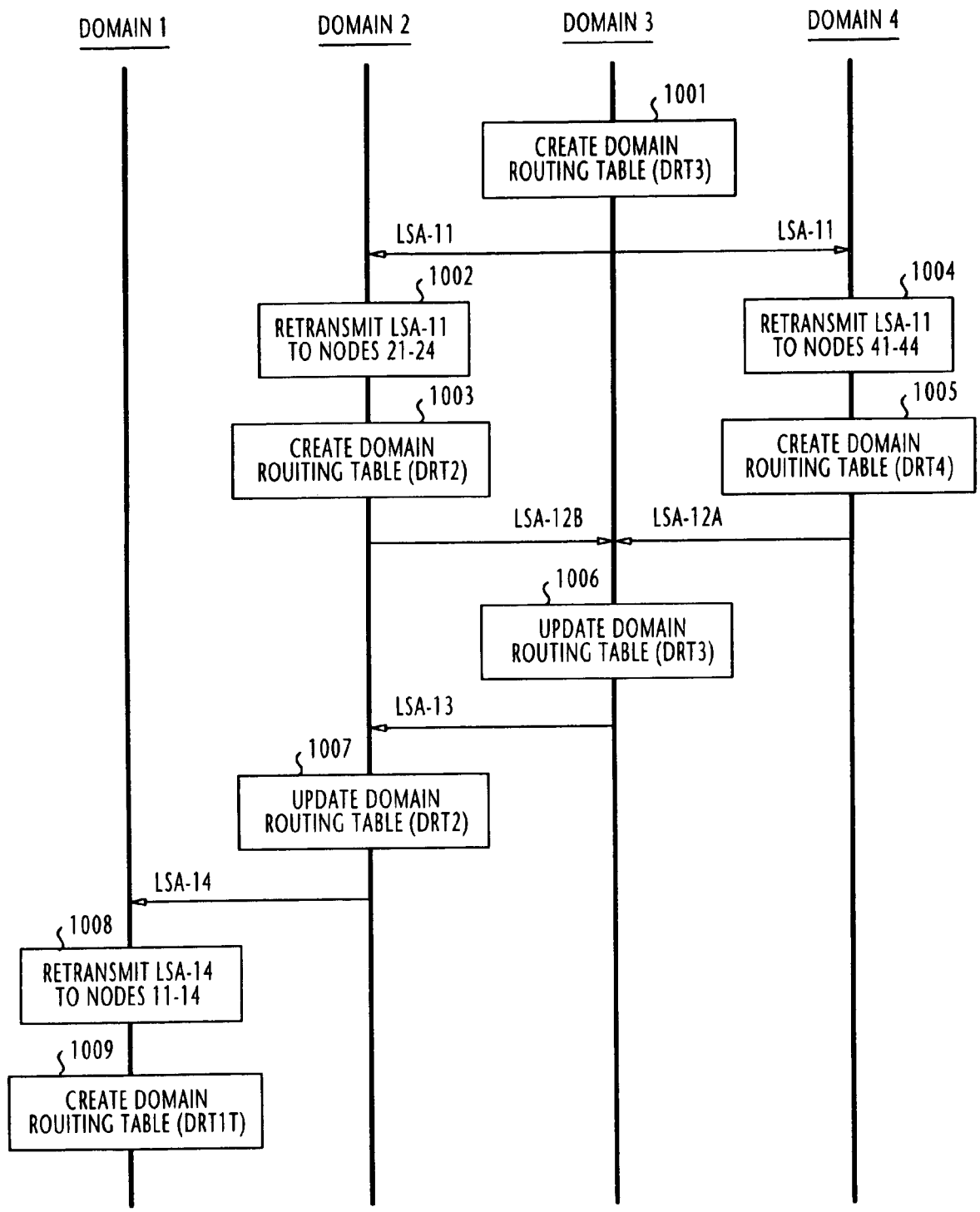

FIG. 11

DOMAIN ROUTING TABLE OF DOMAIN 3 CREATED IN RESPONSE TO LSA-11 — DRT3

| CLIENT NODE | OUTGOING BORDER NODE | TRANSIT DOMAINS | INCOMING BORDER NODES |
|---|---|---|---|
| 71 | 31 | 3 | 32, 33 |
| 72 | 32 | 3 | 31, 34 |

DOMAIN ROUTING TABLE OF DOMAIN 2 CREATED IN RESPONSE TO LSA-11 — DRT2

| CN | OBN | TD | IBN |
|---|---|---|---|
| 71 | 24 | 2 - 3 | 22, 23 |

DOMAIN ROUTING TABLE OF DOMAIN 4 CREATED IN RESPONSE TO LSA-11 — DRT4

| CN | OBN | TD | IBN |
|---|---|---|---|
| 71 | 42 | 4 - 3 | 41, 42, 43 |
| 72 | 44 | 4 - 3 | 42, 43 |

LSA-12A

DOMAIN ROUTING TABLE OF DOMAIN 3 UPDATED IN RESPONSE TO LSA-12A — DRT3

| CN | OBN | TD | IBN |
|---|---|---|---|
| 71 | 31 | 3 | 32, 33 |
| 72 | 32 | 3 | 31, 34 |
| 72 | 33 | 3 - 4 - 3 | 33 |

LSA-13

DOMAIN ROUTING TABLE OF DOMAIN 2 UPDATED IN RESPONSE TO LSA-13 — DRT2

| CN | OBN | TD | IBN |
|---|---|---|---|
| 71 | 24 | 2 - 3 | 22, 23 |
| 72 | 24 | 2 - 3 - 4 - 3 | 22, 23 |

LSA-14

DOMAIN ROUTING TABLE OF DOMAIN 1 CREATED IN RESPONSE TO LSA-14 — DRT1

| CN | OBN | TD | IBN |
|---|---|---|---|
| 71 | 14 | 1 - 2 - 3 | 11, 13 |
| 72 | 14 | 1 - 2 - 3 - 4 - 3 | 11, 13 |

FIG. 15
FIG. 16
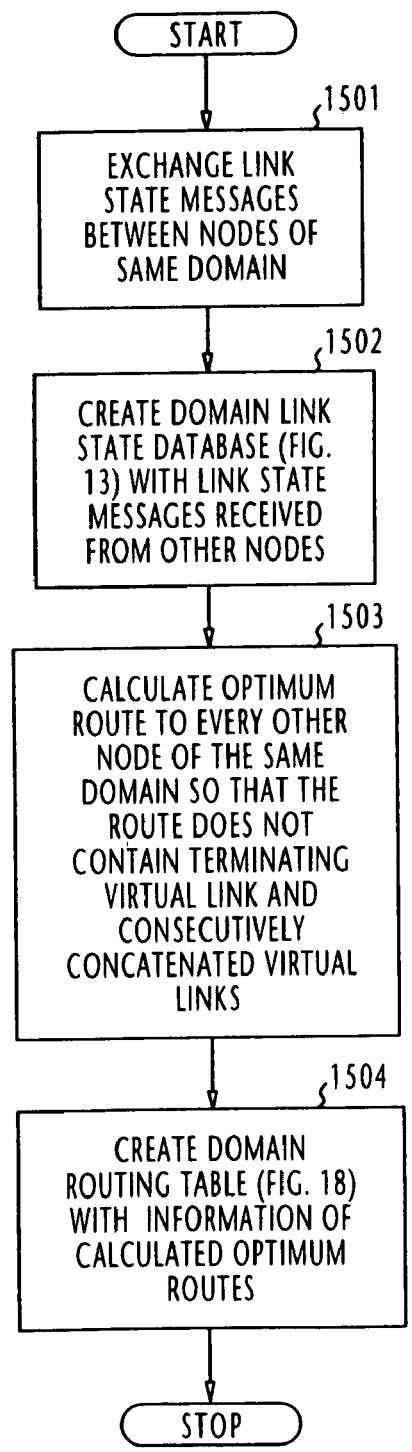
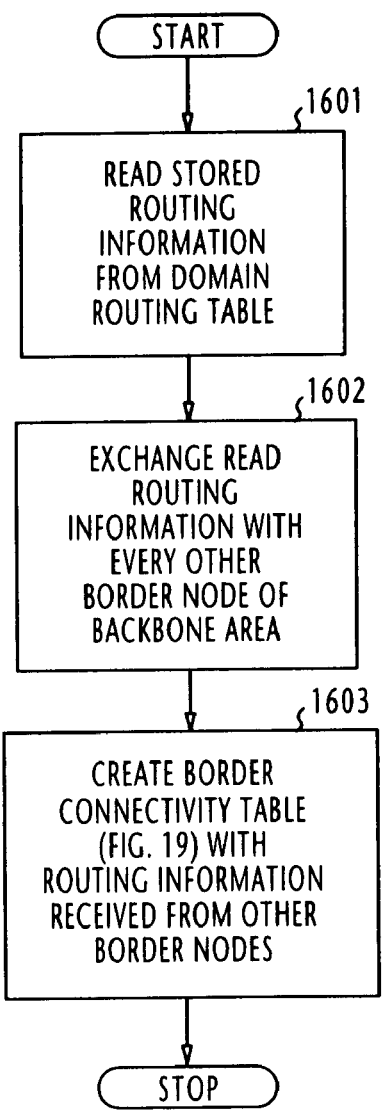

FIG. 18A

DOMAIN ROUTING TABLE OF NODE 11 — DRT11

| SOURCE | DESTINATION | ROUTE | COST |
|---|---|---|---|
| NN 11 | NN 12 | NN 11 – NN 12 | |
| | BN 13 | NN 11 – BN 13 | |
| | BN 14 | NN 11 – BN 14 | |

FIG. 18B

DOMAIN ROUTING TABLE OF NODE 34 — DRT34

| SOURCE | DESTINATION | ROUTE | COST |
|---|---|---|---|
| BN 34 | NN 31 | BN 34 – NN 31 | |
| | BN 32 | BN 34 – BN 32 | |
| | BN 33 | BN 34 – BN 33 | |

FIG. 18C

DOMAIN ROUTING TABLE OF NODE 33 — DRT33

| SOURCE | DESTINATION | ROUTE | COST |
|---|---|---|---|
| BN 33 | BN 31 | BN 33 – BN 31 | |
| | BN 32 | UNREACHABLE | |
| | BN 34 | BN 33 – BN 34 | |

FIG. 19

BORDER CONNECTIVITY TABLE　BCT

| DOMAIN | BORDER NODE | REACHABLE DOMAIN NODES |
|---|---|---|
| 1 | 13 | 11, 12, 14 |
| 1 | 14 | 11, 12, 13 |
| 2 | 21 | 22, 23 |
| 2 | 22 | 21, 23, 24 |
| 2 | 23 | 21, 22, 24 |
| 2 | 24 | 22, 23 |
| 3 | 33 | 31, 34 |
| 3 | 34 | 31, 32, 33 |
| 4 | 41 | 42, 43 |
| 4 | 42 | 41, 43, 44 |
| 4 | 44t | 42, 43 |

FIG. 20

BACKBONE LINK STATE DATABASE
BLSD

| LINK | BORDER NODE A | BORDER NODE B | COST | WVLGTH |
|------|---------------|---------------|------|--------|
| D1 | 15 | 16 | | |
| D2 | 21 | 22 | | |
| D3 | 21 | 25 | | |
| D4 | 22 | 25 | | |
| D5 | 22 | 26 | | |
| D6 | 25 | 26 | | |
| D7 | 35 | 36 | | |
| D8 | 41 | 42 | | |
| D9 | 42 | 46 | | |
| B1 | 15 | 21 | | |
| B2 | 16 | 22 | | |
| B3 | 25 | 41 | | |
| B4 | 26 | 35 | | |
| B5 | 35 | 42 | | |
| B6 | 36 | 46 | | |

D1–D9: INTER-BORDER VIRTUAL DOMAIN LINKS

B1–B6: INTER-BORDER BACKBONE PHYSICAL LINKS

FIG. 21A

BACKBONE ROUTING TABLE OF BORDER NODE 13

BRT13

| SOURCE | DESTINATION | ROUTE | COST |
|---|---|---|---|
| BN 13 | BN 21 | 13 – 21 | |
| | BN 22 | UNREACHABLE | |
| | BN 23 | UNREACHABLE | |
| | BN 24 | 13 – 21 – 23 – 41 – 42 – 33 – 24 | |
| | BN 33 | 13 – 21 – 23 – 41 – 42 – 33 | |
| | BN 34 | UNREACHABLE | |
| | BN 41 | 13 – 21 – 23 – 41 | |
| | BN 42 | UNREACHABLE | |
| | BN 44 | 13 – 21 – 23 – 41 – 42 – 33 – 34 – 44 | |

FIG. 21B

BACKBONE ROUTING TABLE OF BORDER NODE 14

BRT14

| SOURCE | DESTINATION | ROUTE | COST |
|---|---|---|---|
| BN 14 | BN 21 | UNREACHABLE WITHIN DOMAIN 2 | |
| | BN 22 | 14 - 22 | |
| | BN 23 | 14 - 22 - 23 | |
| | BN 24 | 14 - 22 - 24 | |
| | BN 33 | 14 - 22 - 23 - 41 - 42 - 33 | |
| | BN 34 | 14 - 22 - 24 - 33 - 34 | |
| | BN 41 | 14 - 22 - 23 - 41 | |
| | BN 42 | 14 - 22 - 24 - 33 - 42 | |
| | BN 44 | 14 - 22 - 24 - 33 - 34 - 44 | |

COMMUNICATIONS NETWORK WITH ROUTING TABLES FOR ESTABLISHING A PATH WITHOUT FAILURE BY AVOIDING UNREACHABLE NODES

BACKGROUND OF THE INVENTION

1. Field of the Invention

The present invention relates generally to communications networks in which cross-connect nodes are organized into a plurality of groups corresponding to geographic domains and in which constraints are imposed on intra-domain node-to-node connectivity. More specifically, the present invention relates to a path finding technique for avoiding unreachable nodes which would otherwise be encountered due to connectivity constraints.

2. Description of the Related Art

In an optical communications network, a number of optical cross-connect nodes are interconnected by optical links and wavelength division multiplexers are provided between neighbor nodes to support a number of parallel wavelength channels. Different network providers and administrators organize the optical communications network into a number of groups corresponding to geographic domains for efficient network management and administration. For establishing a path across the network, use is made of a distance vector algorithm known as the BGP (border gateway protocol) routing protocol (RFC 1771) that operates on TCP/IP. According to the BGP routing protocol, neighbor domain nodes use the BGP open message and the BGP keepalives message during a neighbor discovery process and create a routing table from BGP update messages advertised from neighbor domains. Based on the routing table, each domain perform route calculations and then advertise its calculated routes and updates its routing table. As the advertisement process is repeated, the contents of each routing table tend to converge to a set of invariable values.

On the other hand, the optical cross-connect node has the ability to perform its switching function on optical signals of any transmission rate or any data format. However, if signals are "transparently" propagated through a large number of optical nodes or transmitted over long distances, they would suffer from serious distortion due to noise and attenuation with a result that their bit error rate becomes higher than the prescribed acceptable level. Additionally, optical cross-connect nodes may also be configured with an optical add-drop multiplexer (OADM) which is only capable of performing its add-drop function on a particular wavelength. Such cross-connect nodes do not have non-blocking feature. Hence, connectivity may be constrained within a domain to such an extent that no accessibility exists between particular nodes within that domain. Connectivity constraint may arise on a particular intra-domain route. Due to this intra-domain connectivity constraint, attempts to set up a path using the BGP routing protocol may encounter a failure.

One solution is to have all network nodes share connectivity constraints information in common. However, the amount of such information each network node could hold in its memory would be significantly large, which could lead to the loss of network scalability.

SUMMARY OF THE INVENTION

It is therefore an object of the present invention to provide a communications network that ensures against path setup failures by designing intra-domain connectivity constraints into routing tables.

Another object of the present invention is to provide a communications network in which path setup failures are prevented while network scalability is maintained.

According to a first aspect of the present invention, there is provided a communications network comprising a plurality of network nodes interconnected by communication links, the network nodes being organized into a plurality of groups corresponding to geographic domains, ones of the network nodes located at periphery of the network functioning as edge nodes to which user terminals are connected, a plurality of domain connectivity tables respectively associated with the domains, each of the domain connectivity tables indicating intra-domain connectivity of the associated domain, and a plurality of domain routing tables respectively associated with the domains, each of the domain routing tables indicating a route specifying ones of the network nodes whose intra-domain connectivity is indicated in the domain connectivity table of the associated domain, By using the routing tables, the network nodes establish a path between the edge nodes in response to a path setup request from the user terminals.

According to a second aspect of the present invention, there is provided a communications network comprising a plurality of network nodes organized into a plurality of groups corresponding to geographic domains. Those network nodes located at periphery of the network function as edge nodes to which user terminals are connected, and those network nodes located at border points between neighbor domains function as border nodes. The border nodes of same domain are interconnected by intra-domain virtual links and the border nodes of different domains are interconnected by inter-domain physical links. A plurality of domain routing tables are respectively provided for the domains. Each domain routing table indicates a plurality of routes containing no intra-domain virtual link terminating at the edge nodes and no consecutively concatenated intra-domain virtual links. A backbone routing table indicates a plurality of inter-domain routes and unreachability indications between the border nodes of each domain and the border nodes of every other domain. The inter-domain routes contain at least one of the inter-domain physical links but contain no consecutively concatenated intra-domain virtual links. By using the domain routing tables and the backbone routing table, the network nodes establish a path between the edge nodes in response to a path setup request from the user terminals.

BRIEF DESCRIPTION OF THE DRAWINGS

The present invention will be described in detail further with reference to the following drawings, in which:

FIG. 3 is an illustration of inter-domain connectivity tables of the respective network domains; and FIG. 4 is an illustration of domain connectivity tables of the respective network domains;

FIG. 6A is an illustration of a process of creating a domain routing table of a source domain;

FIG. 6B is an illustration of a process of creating a domain routing table of a first intermediate domain;

FIG. 6C is an illustration of a process of creating a domain routing table of a second intermediate domain;

FIG. 6D is an illustration of a process of updating the domain routing table of the first intermediate domain;

FIG. 6E is an illustration of a process of creating a domain routing table of a destination domain;

FIG. 10 is a sequence diagram for illustrating a sequence of events that occur in the network when the domain routing tables are created according to the second embodiment of the present invention;

FIG. 11 is an illustration of a process of creating domain routing tables of all network domains according to the second embodiment;

FIG. 15 is a flowchart of the operation of a domain routing processor according to the third embodiment of the invention for creating a domain link state database and a domain routing table;

FIG. 16 is a flowchart of the operation of a backbone routing processor according to the third embodiment of the invention for creating an border connectivity table;

FIGS. 18A~18C are illustrations of the domain routing tables of several network domains;

FIG. 19 is an illustration of the border connectivity table;

FIG. 20 is an illustration of the backbone link state database;

FIGS. 21A and 21B are illustrations of the backbone routing tables of a number of border nodes;

DETAILED DESCRIPTION

Figure 1:
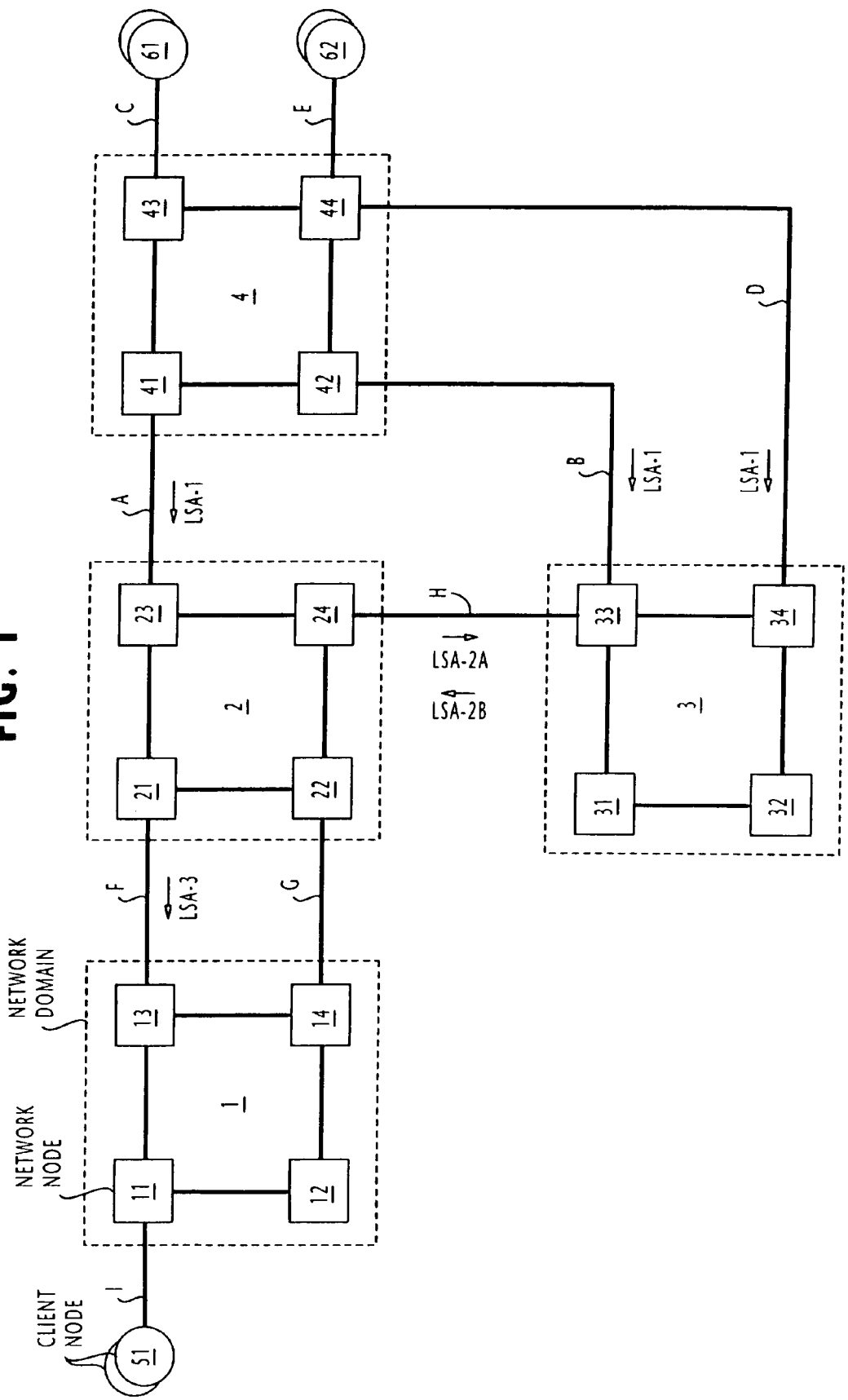
FIG. 1 is a block diagram of an optical communication network of the present invention, in which the network is divided into four domains.

Referring now to FIG. 1, there is shown an optical network comprising a plurality of optical cross-connect network nodes 11 through 34. An optical client node 51 is connected to the edge node 11 and optical client nodes 61 and 62 are connected to the edge nodes 43 and 44, respectively. The network is divided into a plurality of network domains 1 through 4. All network domains and client nodes are interconnected by optical links A through I and the nodes within each domain are also interconnected by optical links. In each network domain, the nodes that are interconnected with the nodes in other domains are called as border nodes. In the illustrated example, nodes 13, 14, 33, 34, 41, 42, 44 and all nodes of domain 2 are the border nodes. Note that the network of FIG. 1 is simplified for the purpose of disclosure. A greater number of nodes are included so that each domain may contain one or more intermediate or transit node, not shown in the drawings.

Because of transparent (no amplification) optical transmission, signals may suffer degradation as they propagate through the network. Optical cross-connect nodes may also be configured with an optical add-drop multiplexer (OADM) which is only capable of performing its function on a particular wavelength. Such cross-connect nodes do not have non-blocking feature. Hence, connectivity may be constrained within a domain to such an extent that no accessibility exists between particular nodes within that domain.

Control messages are exchanged between neighboring network nodes via network-to-network interfaces during route calculation and path setup phases. Path setup and disconnect requests are transmitted from the client nodes via user-to-network interfaces to the associated edge nodes. These interfaces establish bi-directional control channels.

Figure 2:
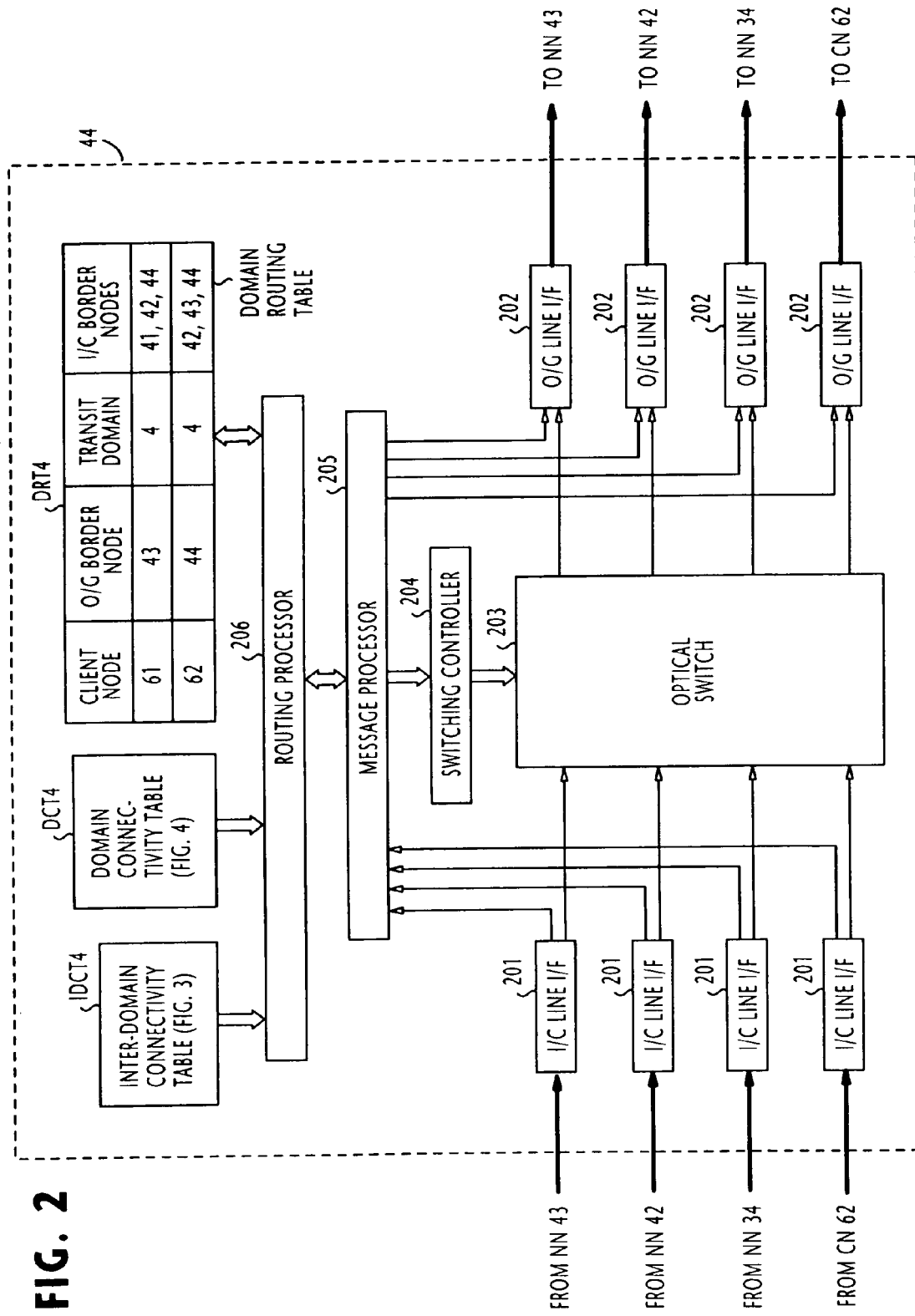
FIG. 2 is a block diagram of an optical cross-connect node of FIG. 1.

FIG. 2 shows in detail the internal configuration of the optical cross-connect node 44 as a representative of all nodes of the network. An optical switch 203 is provided for establishing optical connections between incoming line interfaces 201 and outgoing line interfaces 202 in response to a switching command signal from a switching controller 204. Note that no electro-optical conversion and no opto-electrical conversion are performed in both incoming and outgoing line interfaces. Thus, optical transparency is ensured between incoming and outgoing optical links. The switching command signal is formulated in accordance with routing information supplied from a message processor 205, which is connected to the incoming and outgoing line interfaces 201, 202 and a routing processor 206. Message processor 205 receives control messages from the incoming line interfaces 201, reformulates them according to the output of routing processor 206 and retransmits the reformulated control messages through the outgoing line interfaces 202, while at the same time giving information to the switching controller 204 specifying which connection to establish within the optical switch 203. Routing processor 206 is associated with an inter-domain connectivity table IDCT, a domain connectivity table DCT and a domain routing table DRT. Each of these tables is uniquely determined by the configuration of the domain to which each network node belongs. Therefore, the network nodes 41-44 use the same inter-domain connectivity table IDCT4, the same domain connectivity table DCT4 and the same domain routing table DRT4 of the domain 4.

As shown in detail in FIG. 3, in the inter-domain connectivity tables IDCT1-IDCT4 of the domains 1 through 4, optical links are mapped to home network nodes and border/client nodes. In the case of domain 4, for example, links A, B, C, D, E are respectively mapped in the inter-domain connectivity table IDCT4 to home network nodes 41, 42, 43, 44, 44 and border/client nodes 23, 33, 61, 34, 62.

Note that in a practical aspect of the present invention the inter-domain connectivity table IDCT includes the identifiers of the incoming and outgoing line interfaces for each entry in addition to the node identifiers in order to uniquely specify their associated optical links. However, in order to avoid unnecessarily obscuring the present invention, the line interface identifiers are omitted from the inter-domain connectivity tables.

Details of the domain connectivity tables DCT1 through DCT4 of domains 1 to 4 are shown in FIG. 4. Each domain connectivity table shows connectivity within its domain by symbols O (availability) and X (unavailability). In the case of domain 4, the domain connectivity table DCT4 indicates that the node 41, for example, is accessible to nodes 42 and 43 but inaccessible to node 44.

A domain routing table DRT is created based on the inter-domain connectivity table and the domain connectivity table and in addition to a link state advertisement (LSA) message received from neighboring node. This table creation process start with a source node which relies only on its inter-domain connectivity table and its domain connectivity table to create its own domain routing table. The created domain routing table is sent to a neighboring node as an LSA message.

As shown in FIG. 2, the domain routing table DRT of domain 4 maps client nodes 61 and 62 respectively to outgoing border nodes from which the domain 4 transmits its signals to the client nodes 61 and 62, the transit domain, and sets of incoming border nodes from which the client nodes transmit their signals from the domain 4 to neighboring domains. To the client node 61, for example, the node 43 is mapped as an outgoing border node and the border nodes 41, 42, 44 are mapped as incoming border nodes.

Figure 5:
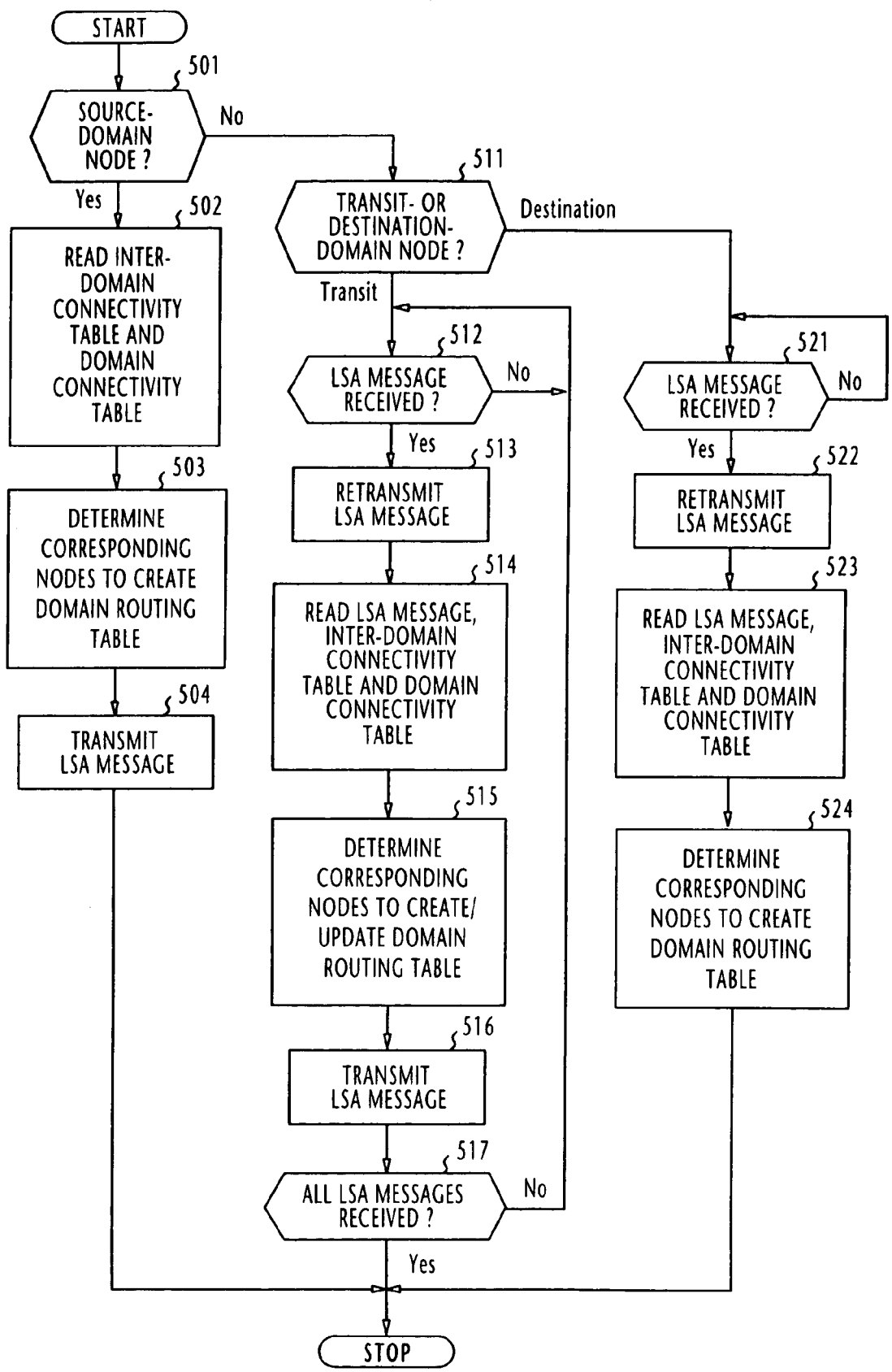
FIG. 5 is a flowchart of the operation of a network node according to a first embodiment of the present invention when the node creates a domain routing table.
Figure 7:
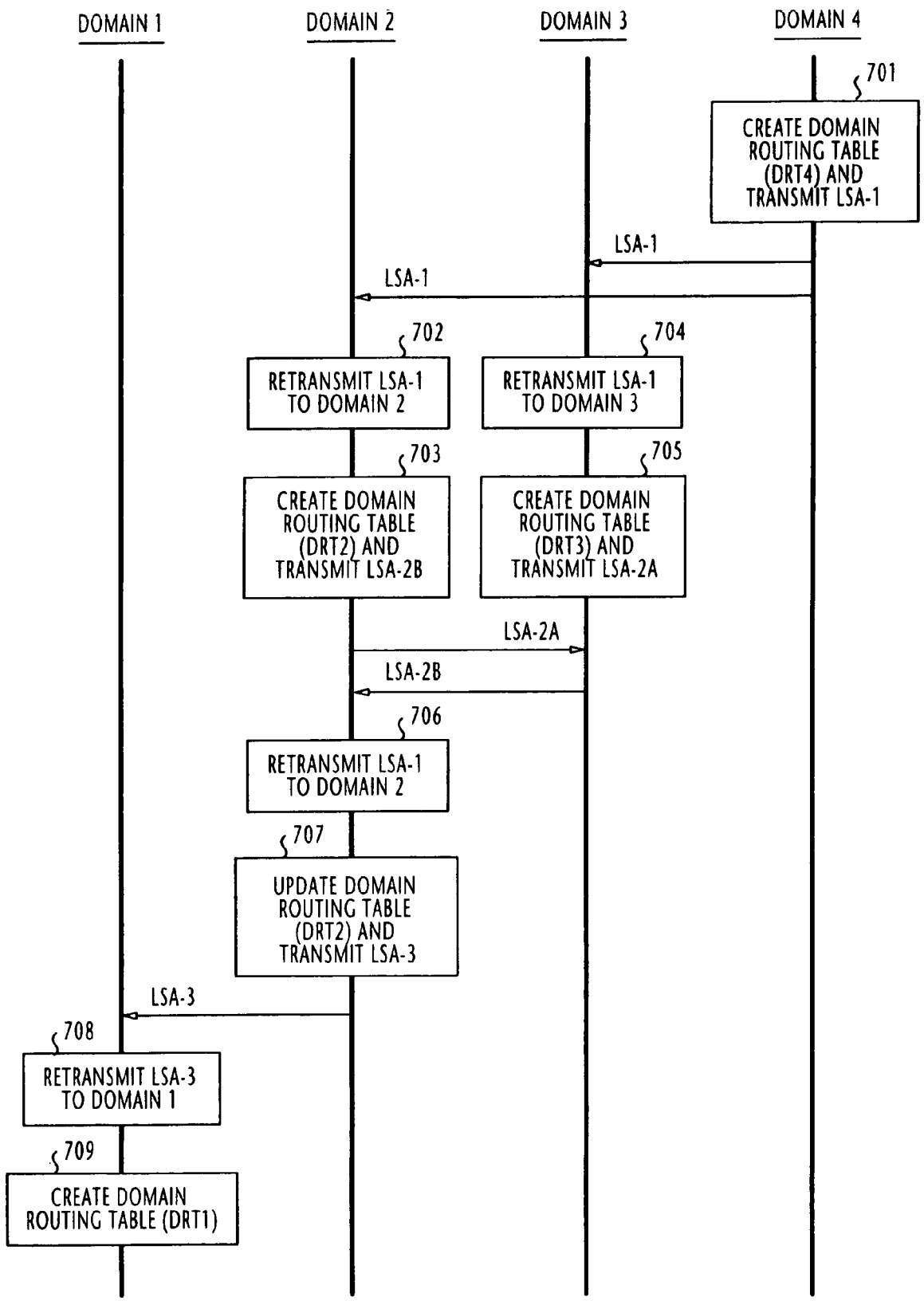
FIG. 7 is a sequence diagram for illustrating a sequence of events that occur in the network when the domain routing tables are created according to the first embodiment of the present invention.

FIG. 5 is a flowchart illustrating the operation of the routing processor 206 of each network node to create its own domain routing table DRT.

The operation of the routing processor starts with decision step 501 to determine whether its node is a source domain node. If so, the routing processor proceeds to step 502 to read the contents of the inter-domain connectivity table IDCT and the domain connectivity table DCT and determines, at step 503, corresponding nodes to create the domain routing table DRT. The contents of the domain routing table are transmitted as an LSA message to the network at step 504.

If the decision at step 501 is negative, the routing processor proceeds to step 511 to determine if its own node is a transit domain node or a destination domain node. If its own node is a transit domain node, the routing processor proceeds to step 512 to check to see if an LSA message is received. If an LSA message is received from a border node of a neighboring domain, the routing processor retransmits a copy of the message to neighbor nodes of the same domain (step 513) and reads the contents of the message as well as the contents of its inter-domain connectivity table and its domain connectivity table (step 514), and determines corresponding nodes and creates (updates) a domain routing table (step 515). The contents of the domain routing table are transmitted as an LSA message to the next node on the route to the destination domain. The routing processor of the transit domain nodes repeats steps 512 to 516 until all LSA messages are received.

If the node of the routing processor is the destination domain node, the routing processor proceeds from step 511 to step 521 to check to see if an LSA message is received. If so, the routing processor retransmits a copy of the message to the other nodes of the same domain and reads the contents of the message as well as the contents of its inter-domain connectivity table and its domain connectivity table (step 523), and determines corresponding nodes and creates a domain routing table (step 524).

The operation of the flowchart of FIG. 5 will be best understood with the following description with the aid of FIGS. 6A to 6E and 7 by assuming that the domain 4 is the source domain the domain 1 is the destination domain and constrained connectivity (inaccessibility) exists between nodes 41 and 43 as illustrated in the domain connectivity table DCT4.

Referring to FIG. 6A, if the domain 4 is the source domain, the routing processor examines both inter-domain connectivity table IDCT4 and domain connectivity table DCT4. Since the inter-domain connectivity table IDCT4 indicates that the node 43 is the home network node of client node 61 and since the domain connectivity table DCT4 indicates that nodes 41, 42, 44 are accessible to the home node 43 of the client node, the routing processor determines, for client node 61, that the node 43 is an outgoing border node from domain 4 to client node 61 and that the nodes 41, 42, 44 are incoming border nodes from client node 61 and maps these relationships in a domain routing table DRT4.

Further, the inter-domain connectivity table IDCT4 indicates that the node 44 is the home node of client node 62 and the domain connectivity table DCT4 indicates that the nodes 42, 43, 44 are accessible to node 44. Therefore, the routing processor determines, for client node 62, the node 44 as an outgoing border node from domain 4 to client node 62 and the nodes 42, 43, 44 as incoming border nodes from client node 62 to domain 4 because of their accessibility to node 44 and maps the client node 62 to these nodes in the domain routing table DRT4. In this case, the domain 4 is the transit domain. The created domain routing table DRT4 is transmitted as an LSA-1 message from the domain 4 to domains 2 and 3 at the same time (step 701, FIG. 7).

Border node 23 responds to the LSA-1 message from the domain 4 by advertising its copy to nodes 21 and 24 (step 702) and creates a domain routing table DRT2 shown in FIG. 6B. The routing processor of node 23 examines the contents of LSA-1 message as well as both inter-domain connectivity table IDCT2 and domain connectivity table DCT2. Since node 41 is indicated in LSA-1 message as an incoming border node from client node 61 to domain 4 and is mapped in inter-domain connectivity table IDCT2 to node 23 and the latter is indicated in domain connectivity table DCT2 as being accessible to node 22, the routing processor of border node 23 maps client node 61, in domain routing table DRT2, to node 23 as an outgoing border node and nodes 21, 22, 24 as incoming border nodes. The transit domains for the client node 61 includes domains 2 and 4. The domain routing table DRT2 is transmitted as an LSA-2A (step 703) to the node 24 where it is advertised to domain 3. At this moment, the client node 62 is not mapped in the domain routing table DRT2 since the LSA-1 message from domain 4 is not sufficient for mapping it in this table.

Meanwhile, each of the domain-3 nodes 33 and 34 responds to the LSA-1 message from the domain 4 by advertising its copy to other nodes of the same domain (step 704) and creates a domain routing table DRT3 shown in FIG. 6C. The routing processor of node 33, for example, examines the contents of LSA-1 message as well as both inter-domain connectivity table IDCT3 and domain connectivity table DCT3.

It is seen that the node 42 is indicated in LSA-1 as an incoming border node from client node 61 to domain 4 and is mapped in inter-domain connectivity table IDCT3 to node 33 which is also indicated in domain connectivity table DCT3 as being accessible to nodes 33, 34. As a result, the routing processor of node 33 maps these relationships in a first entry 601 of the domain routing table DRT3, with the node 33 as an outgoing border node from domain 3 to client node 61 and the nodes 33 and 34 as incoming border nodes from client node 61 to domain 3.

Since the node 44 is indicated in LSA-1 as an incoming border node from client node 61 to domain 4 and is mapped in IDCT3 to node 34 which is indicated in DCT3 as being accessible to node 33, these relationships are mapped in a second entry 602 of domain routing table DRT3, with the node 34 as an outgoing border node from domain 3 to client node 61 and the node 33 as an incoming border node from client node 61 to domain 3.

Node 42 is further indicated in LSA-1 as an incoming border node from client node 62 to domain 4 and is mapped in IDCT3 to node 34 which is indicated in DCT3 as being accessible to nodes 33. These relationships are mapped in a third entry 603 of the domain routing table DRT3, with the node 33 as an outgoing border node from domain 3 to client node 62 and the nodes 33 and 34 as incoming border nodes from client node 62 to domain 3.

Node 44 is further indicated in LSA-1 as an incoming border node from client node 62 to domain 4 and is mapped in IDCT3 to node 34 which is indicated in DCT3 as being accessible to node 33. These relationships are mapped in a third entry 604 of the domain routing table DRT3, with the node 34 as an outgoing border node from domain 3 to client node 62 and the node 33 as an incoming border node from client node 62 to domain 3. In all entries 601 to 604, the domains 3 and 4 are indicated as domains on the transit route. Contents of the domain routing table DRT3 are then advertised as an LSA-2B message to domain 2 (step 705).

Meanwhile, the nodes in domain 3 do not perform updating of the domain routing table DRT3 in response to the LSA-2A message from domain 2 since taking the route from domain 3 to client node 61 via domain 2 is a long way around.

In response to the LSA-2B message from domain 3, the border node 24 advertises a copy of this message to the other nodes of domain 2 (step 706) and updates its domain routing table DRT2 as shown in FIG. 6D.

Since LSA-2B message advertises that the node 33 is an incoming border node from client node 62 to domain 3 and is mapped in the inter-domain connectivity table IDCT2 to node 24 which domain connectivity table DCT3 shows that node 24 is accessible to nodes 22, 23, the routing processor of node 24 determines that the node 24 is an outgoing border node from domain 2 to client node 62 and the nodes 22 and 23 are incoming border nodes from client node 62 to domain 2. These relationships are mapped in a new entry of the domain routing table DRT2 as shown in FIG. 6D, with the domains 2-3-4 being indicated as a transit route, Contents of the domain routing table DRT2 are advertised as an LSA-3 message to the domain 1 (step 707).

In response to the LSA-3 message from domain 2, the node 13 advertises its copy to the other nodes of domain 1 (step 708) and starts creating a domain routing table DRT1 (step 709). Since the node 21 is indicated in the LSA-3 message as an incoming border node from client node 61 to domain 2 and is mapped in the inter-domain connectivity table IDCT12 to node 13 which is indicated in the domain connectivity table DCT1 as being accessible to nodes 11, 14, the routing processor of node 13 establishes these relationships in a first entry 611 of the domain routing table DRT1, with the node 13 as an outgoing border node from domain 1 to client node 61 and the nodes 11 and 14 as incoming nodes from client node 61 to domain 1. Domains 1-2-4 are mapped as domains on the transit route from client node 61 in the entry 611.

Additionally, the node 22 is indicated in LSA-3 message as an incoming border node from client node 61 to domain 2 and is mapped in inter-domain connectivity table IDCT12 to node 14 which is indicated in the domain connectivity table DCT1 as being accessible to nodes 11, 13. Thus, these relationships are mapped in a second entry 612 of the domain routing table DRT1, with the node 14 as an outgoing border node from domain 1 to client node 61 and the nodes 11 and 13 as incoming nodes from client node 61 to domain 1. Domains 1-2-4 are mapped in the entry 612 as domains on the transit route from client node 61.

Further, the node 22 is indicated in LSA-3 message as an incoming border node from client node 62 to domain 2 and is mapped in inter-domain connectivity table IDCT12 to node 14 which is indicated in the domain connectivity table DCT1 as being accessible to nodes 11, 13. Thus, these relationships are mapped in a third entry 613 of domain routing table DRT1, with the node 14 as an outgoing border node from domain 1 to client node 62 and the nodes 11 and 13 as incoming nodes from client node 62 to domain 1. Domains 1-2-3-4 are mapped in the entry 613 as transit domains on the route from client node 62.

In this way, a domain routing table is created in each domain of the network. Thus, when a client's request is received the domain routing tables of the network are referenced to establish a path to the destination. Since the connectivity constraint of every other domain is designed into each domain routing table, all domain routing tables as a whole ensure against failure in setting up the path. The avoidance of path setup failure eliminates the need to repeat alternate path finding operations. The amount of time the network takes to set up an optical path and the amount of time it takes to establish an alternate path during link failure can be reduced.

For selecting a path through a network it is the usual practice to discard a path that forms a loop in the network so that wasteful use of the network resource can be avoided. However, the discarding of a looping path may result in the loss of a route to some node. A second embodiment of the present invention provides a path selection mechanism that allows a number of loops to be formed within a network, but selects only one loop having a smallest number of transit domains.

Figure 8:
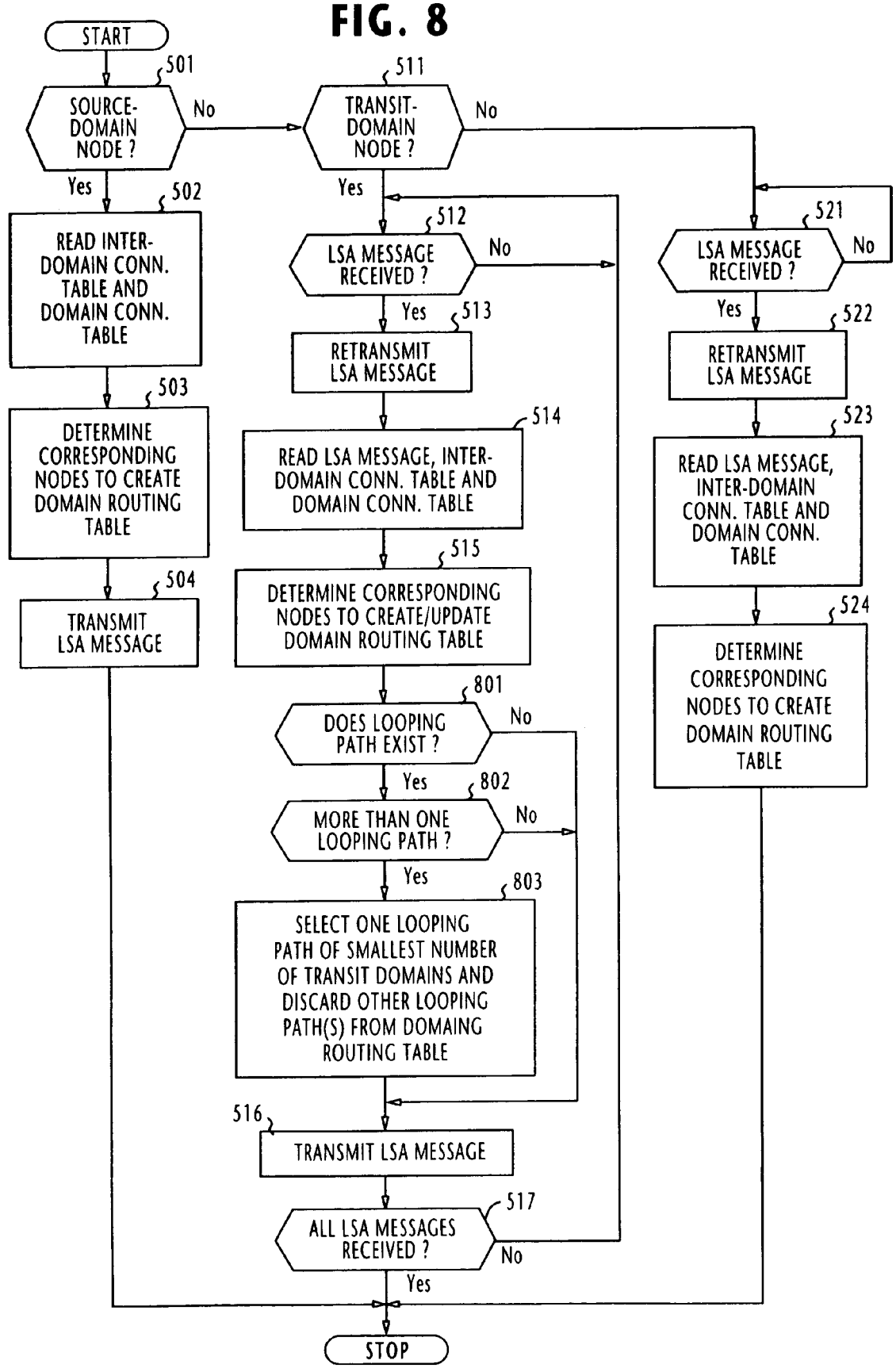
FIG. 8 is a flowchart of the operation of a network node according to a second embodiment of the present invention when the node creates a domain routing table.

FIG. 8 is a flowchart for illustrating the operation of the network nodes according to the second embodiment of the present invention, in which steps corresponding in significance to those in FIG. 5 are marked with the same numerals as used in FIG. 5 and the description thereof is omitted.

Following the domain routing table create/update step 515, the routing processor of the transit domain node examines the domain routing table and determines if a looping path exists in its own domain routing table DRT (step 801). If so, it further determines if there are more than loop (step 802). If the decision is affirmative, flow proceeds to step 803 to select only one looping path having a smallest number of transit domains and discard other looping path(s) from the domain routing table. Following step 803, contents of the domain routing table are transmitted as an LSA message (step 516).

Figure 9:
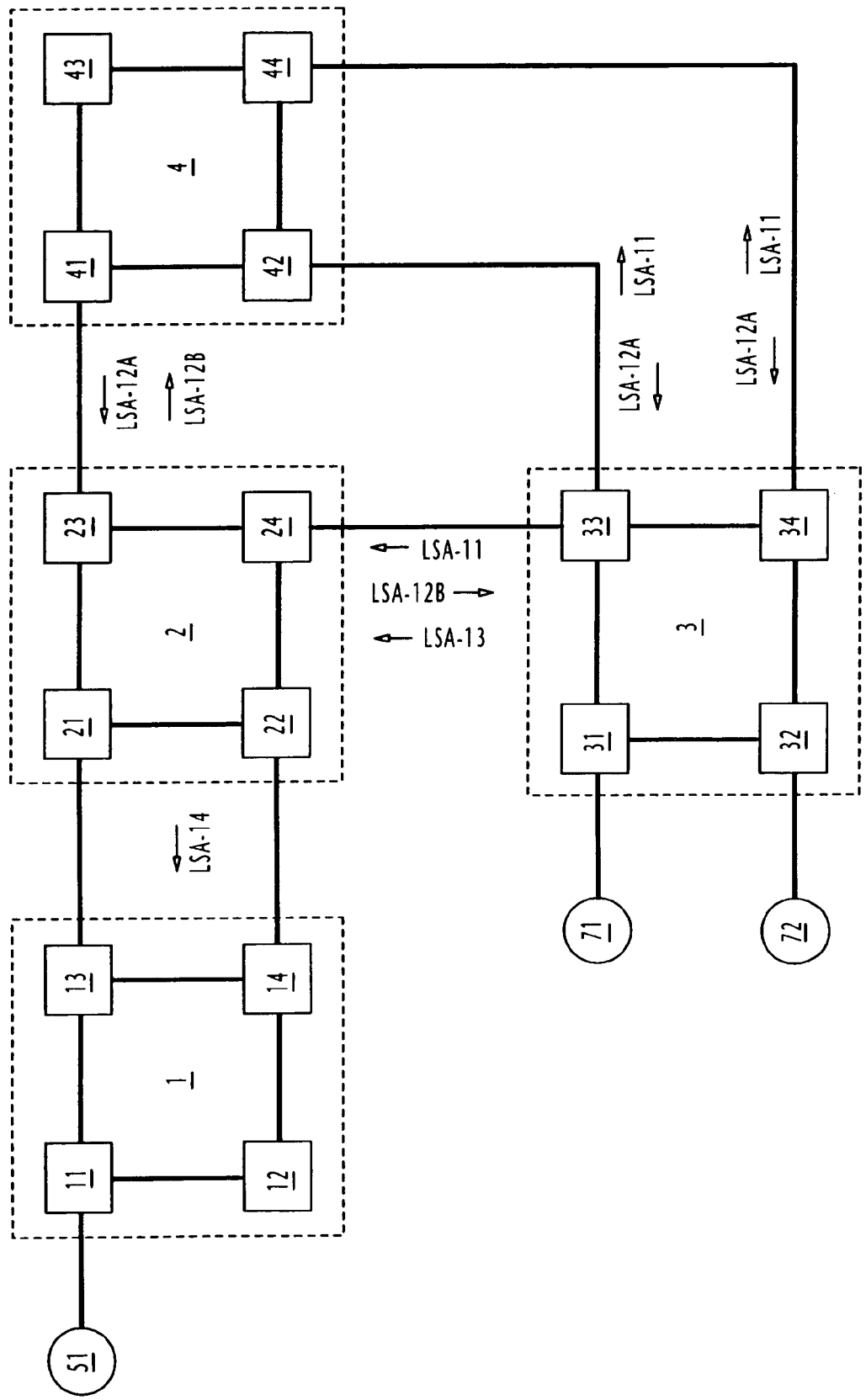
FIG. 9 is a block diagram of the optical network for illustrating link state messages transmitted through the network when domain routing tables are created in the network according to the second embodiment of this invention.

The operation of the flowchart of FIG. 8 will be best understood with the aid of FIGS. 9, 10 and 11.

FIG. 9 shows an optical communication network which is similar to FIG. 1 with the exception that client nodes 71 and 72 are connected to network nodes 31 and 32, respectively, instead of the client nodes 61, 62 connected to the domain 1 of FIG. 1. Hence, the domain 3 is the source domain from which the network starts its routine for creating domain routing tables.

As illustrated in FIG. 10, the domain 3 starts creating its own domain routing table DRT3, as shown in FIG. 11, based on its inter-domain connectivity table IDCT3 and domain connectivity table DCT3 (step 1001).

In FIG. 11, the domain routing table DRT3 indicates that the outgoing border node from domain 3 to client node 71 is the node 31 and the incoming border nodes from client node 71 to domain 3 are the nodes 32 and 33 which are accessible to the node 31 and the transit domain is the domain 3. Further, the domain routing table DRT3 indicates that the outgoing border node from domain 3 to client node 72 is the node 32 and the incoming border nodes from client node 72 to domain 3 are the nodes 31 and 34 which are accessible to the node 32, and the transit domain is the domain 3.

AN LSA-11 message is formulated and transmitted from domain 3 to domains 2 and 4 at the same time to advertise the client nodes and the incoming border nodes of domain routing table DRT3.

The transmitted LSA-11 message is advertised within the domain 2 (step 1002) and a domain routing table DRT2 (see FIG. 11) is created, using the LSA-11 message and its inter-domain connectivity table IDCT2 and domain connectivity table DCT2 (step 1003). Since the LSA-11 message advertises border nodes 32 and 33 for client node 71, of which the node 33 is connected to domain 2, the node 24 is mapped as an outgoing border node of domain 2 and the nodes 22 and 23 which are accessible to node 24 (see DCT2, FIG. 4) are mapped as incoming border nodes of domain 2 for client node 71. Domains 2-3 are mapped as a transit route. On the other hand, the client node 72 is determined as unreachable since the advertised nodes 31, 34 are not connected to the domain 2. Domain 2 formulates an LSA-12B message and transmits it to domains 3 and 4 to advertise the contents of the domain routing table DRT2.

At the same time, the LSA-11 message from domain 3 is advertised within the domain 4 (step 1004) and a domain routing table DRT4 (see FIG. 11) is created, using the LSA-11 message and its inter-domain connectivity table IDCT4 and domain connectivity table DCT4 (step 1005). Since the advertised border nodes of domain 3 for a route to client node 71 are nodes 32 and 33, of which the node 33 is connected to domain 4, the node 42 is mapped as an outgoing border node of domain 4 and the nodes 41, 42 and 43 which are accessible to node 42 (see DCT4, FIG. 4) are mapped as incoming border nodes of domain 4. Domains 4-3 are mapped as a transit route. On the other hand, the advertised border nodes of domain 3 for a route to client node 72 are nodes 31 and 34, of which the node 34 is connected to domain 4. Thus, the node 44 is mapped as an outgoing border node of domain 4 and the nodes 42 and 43 which are accessible to node 42 (see DCT4, FIG. 4) are mapped as incoming border nodes of domain 4. Domains 4-3 are mapped as a transit route. Domain 4 formulates an LSA-12A message and transmits it to domains 2 and 3 to advertise the contents of the domain routing table DRT4.

Since the LSA-12A message from domain 4 advertises, for a route to client node 72, the transit route 4-3 and the nodes 42 and 43, of which the node 42 is connected to the domain 3, the domain 3 updates its domain routing table DRT3 (step 1006) by mapping the node 33 as an outgoing border node as well as an incoming border node for client node 72 in a new entry of the domain routing table DRT3. Domains 3-4-3 are mapped in this entry as a transit route for client node 72. This route has a loop in the domain 3. If this route were discarded from the domain routing table DRT3, the domain 2 has no reachable route to the client node 72. In the present invention, the domain 3 checks to see if more than one looping path exists in the domain routing table DRT3. If there is only one loop, such a loop is maintained in the table DRT3. In the illustrated example, the route 3-4-3 is the only loop and hence it is not discarded. Domain 3 formulates an LSA-13 message and transmits it to domain 2 to advertise the contents of the updated domain routing table DRT3.

Since the LSA-13 message specifies, for a route to client node 72, the transit route 3-4-3 and the node 33 which is connected to the domain 2, the domain 2 updates its domain routing table DRT2 (step 1007) by mapping the node 24 mapped as an outgoing border node and the nodes 22,23 as incoming border nodes as a route to client node 72 in a new entry of the domain routing table DRT2. Domains 2-3-4-3 are mapped in this new entry as a transit route for client node 72. As a result, the domain routing table DRT2 is updated by adding a new route to the client node 72 which were determined as unreachable when this table was initially created in response to the LSA-11 message from domain 3. Domain 2 formulates an LSA-14 message and transmits it to domain 1 to advertise the contents of the updated domain routing table DRT2.

The LSA-14 message is advertised to all nodes of the domain 1 (step 1008) and a domain routing table DRT1 is created (step 1009). Since the LSA-14 message specifies, for client node 71, the route 2-3 and the nodes 22 and 23, of which the node 22 is connected to the domain 1, the node 14 is mapped as an outgoing border node and the nodes 11, 13 are mapped as incoming border nodes for client node 71 in the domain routing table DRT1. Domains 1-2-3 are mapped in this table as a transit route for client node 71. For the client node 72, the LSA-14 message specifies the route 2-3-4-3 and the nodes 22 and 23, of which the node 22 is connected to the domain 1, the node 14 is mapped as an outgoing border node and the nodes 11, 13 are mapped as incoming border nodes for client node 72 in the domain routing table DRT1. Domains 1-2-3-4-3 are mapped in this table as a transit route for client node 72.

Figure 12:
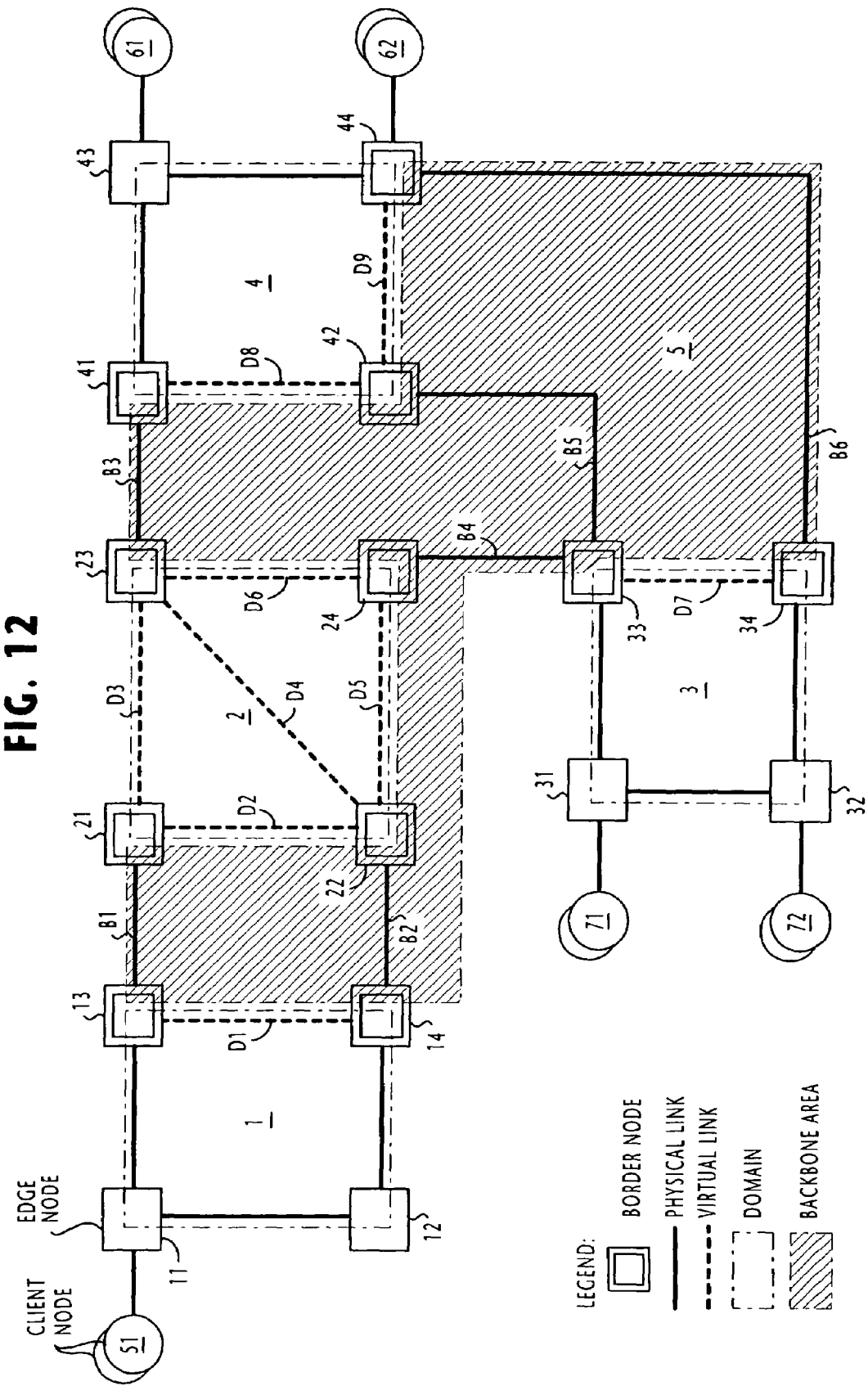
FIG. 12 is a block diagram of the optical communication network which is configured to define a backbone area according to a third embodiment of the present invention.

An optical communication network according to a third embodiment of the present invention is illustrated in FIG. 12. This network is divided into the four domains 1 to 4 as described above and a backbone area 5. In this optical network, the neighboring border nodes of the same domains are interconnected by virtual optical links D1 through D9 and the border nodes of neighboring domains are interconnected by physical optical links B1 through B6 of the backbone area 5. Similar to the previous embodiments, one or more intermediate node may exists between neighboring nodes. To simplify discussion, these intermediate nodes are not shown in the drawings.

In order to ensure connectivity within the backbone area 5 as well as within each domain, the following conditions are built into the configuration of the network:

1) A path shall not terminate with a virtual link; and
2) A path shall not contain consecutively-concatenated virtual links.

Figure 13:
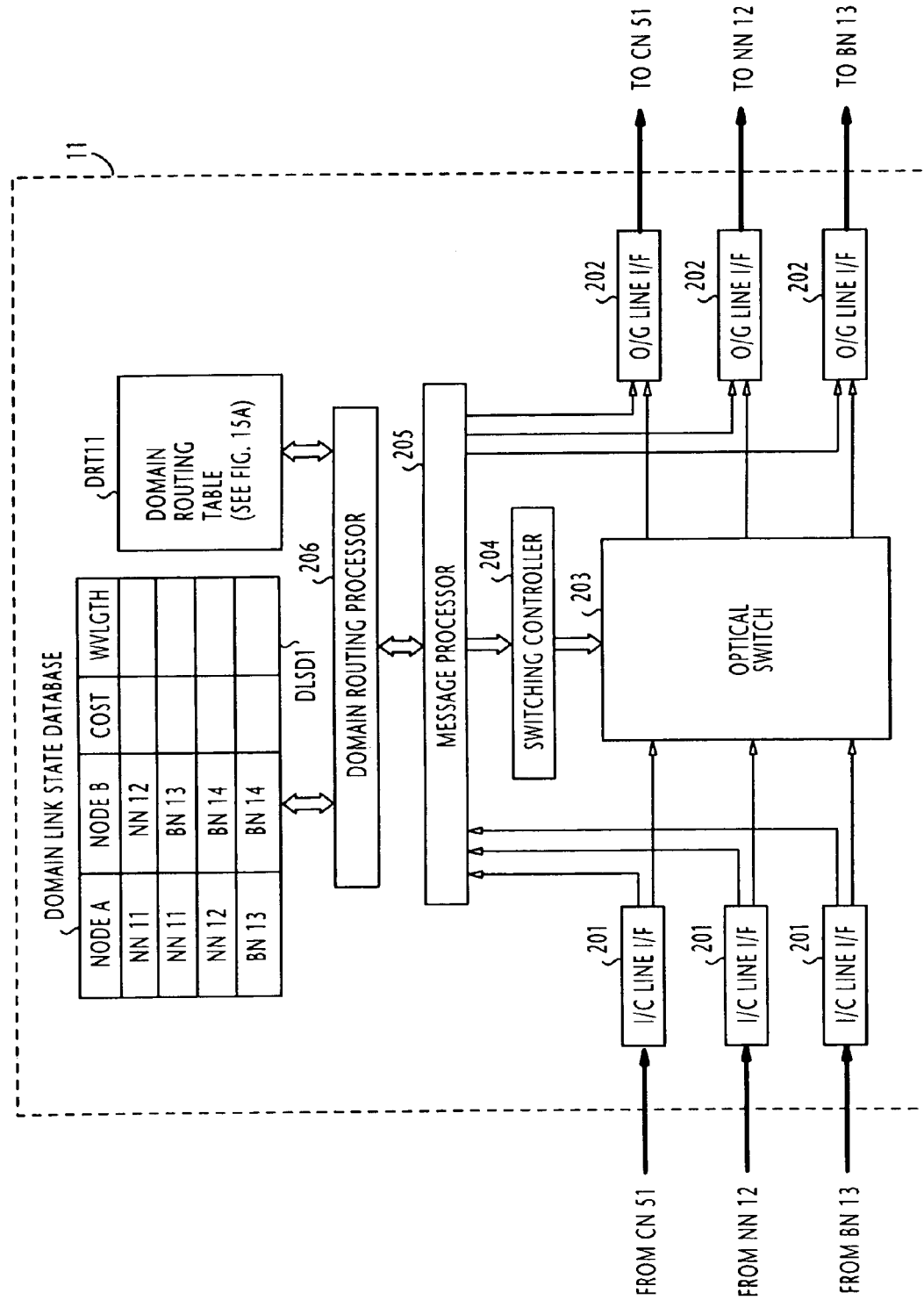
FIG. 13 is a block diagram of a non-border node of the network of FIG. 12.

Edge nodes 11, 12, 31, 32 and 43 are of identical configuration. FIG. 13 shows details of the edge node 11 as a representative edge node. As illustrated, the edge node 11 is of a similar configuration to that shown in FIG. 2. In FIG. 13, the routing processor 206 is associated with a domain link state database DLSD1 of domain 1 and a domain routing table DRT11 of node 11 which is created based on the information contained in the link state database DLSD1.

Figure 14:
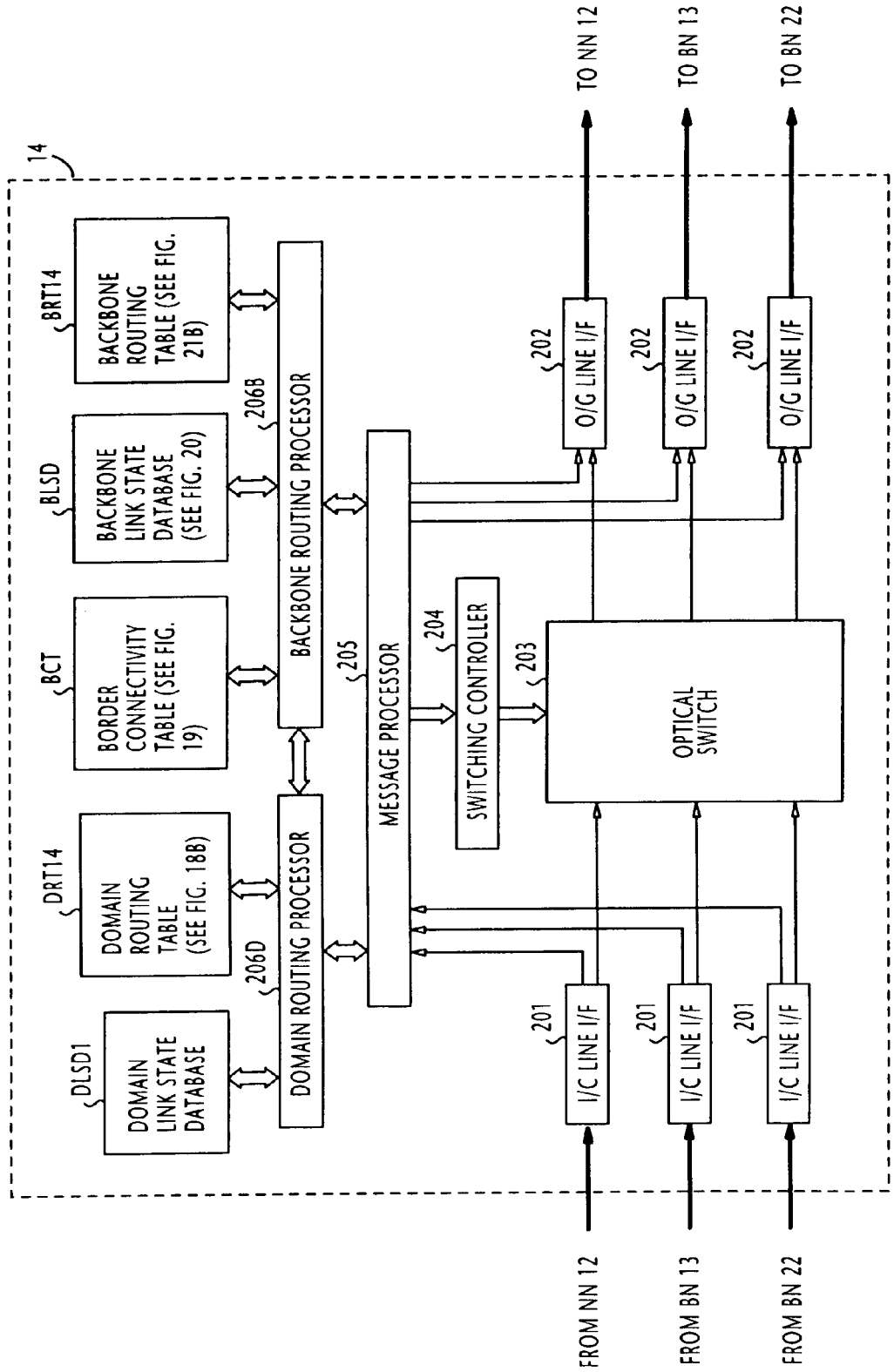
FIG. 14 is a block diagram of a border node of the network of FIG. 12.

Border nodes 13, 14, 21~24, 33, 34, 41, 42 and 44 are of substantially identical configuration. FIG. 14 shows details of the border node 14 as a representative border node. As illustrated, the border node 14 is of a similar configuration to that shown in FIG. 13 with the exception that it includes two routing processors 206D and 206B for domain routing and backbone routing purposes, respectively. Domain routing processor 206D is similar in function to the routing processor of the edge nodes and hence it is associated with a domain routing table DRT14 of node 14 and a domain link state database DLSD1 of domain 1. Therefore, the domain routing processor 206D of node 14 creates its own domain routing table DRT14 and domain link state database DLSD1 in a manner similar to the routing processor of node 11.

Backbone routing processor 206B is associated with an border connectivity table IDCT, a backbone link state database BLSD and a backbone routing table BRT14 of node 14.

As shown in FIG. 15, the link state database DLSD1 of domain 1 is initially created by the routing processor 206 by exchanging optical link state advertisement (LSA) messages (indicating attributes of its optical links such as cost and wavelength) with the routing processors of nodes 12, 13 and 14 using control channels (step 1501) and storing the link state information received from the other nodes of domain 1 into the domain link state database DLSD1 (step 1502). One example of the link state database DLSD1 of domain 1 is shown in FIG. 13. Routing processor 206 of node 11 proceeds to calculate an optimum route from the node 11 to every other node of the domain 1 based on the link state information maintained in the database DLSD1 (step 1503) so that the route does not contain a terminating virtual link and consecutively concatenated virtual links, and stores data representing the calculated optimum routes of node 11 in the domain routing table DRT11 (step 1504). One example of the domain routing table DRT11 is shown in FIG. 18A. A similar process is performed between the nodes of each network domain. As a result, the routing processors of nodes 34 and 33 will create domain routing tables DRT34 and DRT33 as shown in FIGS. 18B and 18C, respectively.

In each entry of the domain routing table DRT shown in FIGS. 18A, 18B and 18C, each network node maps its node (as a source) to every other node of the same domain (as a destination) and to a route from the source to the destination. Information of the cost of the route is also indicated in the corresponding entry of the domain routing table. Note that in FIG. 18C, the route from the border node 33 to the border node 32 is indicated as being "unreachable" due to some connectivity constraint as discussed earlier.

In FIG. 16, the backbone routing processor 206B creates the border connectivity table BCT by reading the stored routing information from the domain routing table DRT14 (step 1601), exchanging the routing information with every other border node of the backbone area 5 (step 1602) and storing the routing information received from all other border nodes of the backbone area into the border connectivity table BCT (step 1603). One example of the border connectivity table BCT is shown in FIG. 19.

Border connectivity table BCT defines connectivity of all border nodes of the network to the nodes of the same domain. Note that the border node 32 is unreachable from the border node 33, but reachable from the border node 34.

Figure 17:
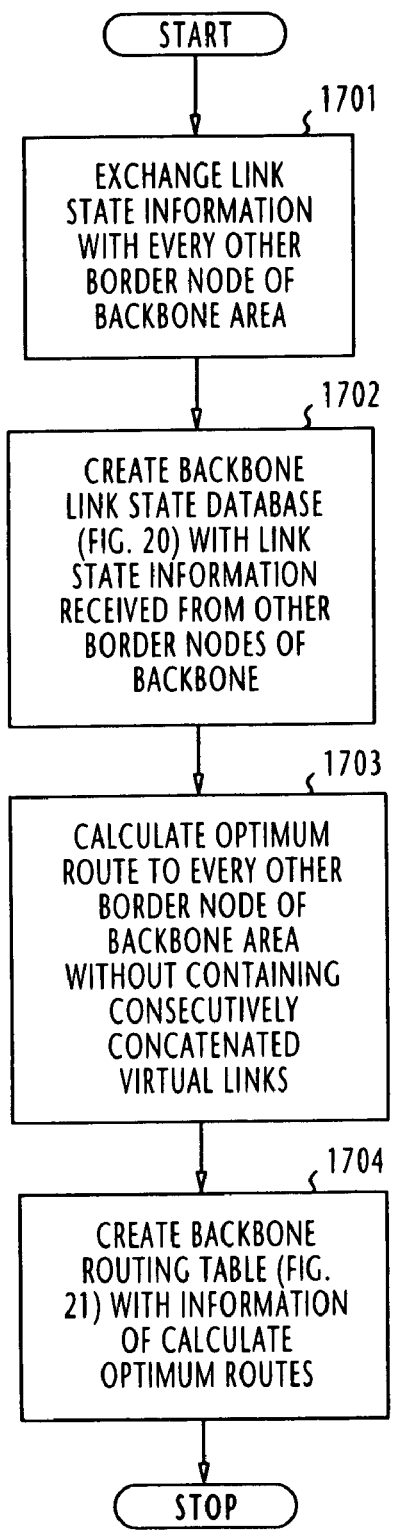
FIG. 17 is a flowchart of the operation of the backbone routing processor according to the third embodiment of the invention for creating a backbone link state database and a backbone routing table.

In FIG. 17, the backbone routing processor 206B creates the backbone link state database BLSD by exchanging link state information with every other border node of the backbone area 5 (step 1701) and storing the link state information received from all other border nodes of the backbone area into the backbone link state database BLSD (step 1702).

As shown in FIG. 20, the backbone link state database BLSD defines inter-border virtual links D1 through D9 within respective domains and inter-border backbone physical links B1 through B6. For each of the virtual and physical links, the link attribute (cost and wavelength) is indicated.

Backbone routing table BRT14 is created by calculating optimum route to every other border node of the backbone area so that the route does not contain consecutively concatenated virtual links (step 1703) and storing information of the calculated optimum routes in the backbone routing table BRT14 (step 1704). One example of the backbone routing table BRT14 is shown in FIG. 21B. In like manner, the backbone routing processor of node 13 will create its own backbone routing table BRT13 as shown in FIG. 21A. The routes indicated in the backbone routing tables of FIGS. 21A and 21B contain no consecutively concatenated virtual links.

In each entry of the backbone routing tables BRT shown in FIGS. 21A, 21B, each border node maps its node (as a source) to every other border node of the network (as a destination), a route from the source to the destination and the cost of the route. Note that FIG. 21A indicates that the border node 13 is unreachable to the border nodes 22, 23 and 42.

Figure 22:
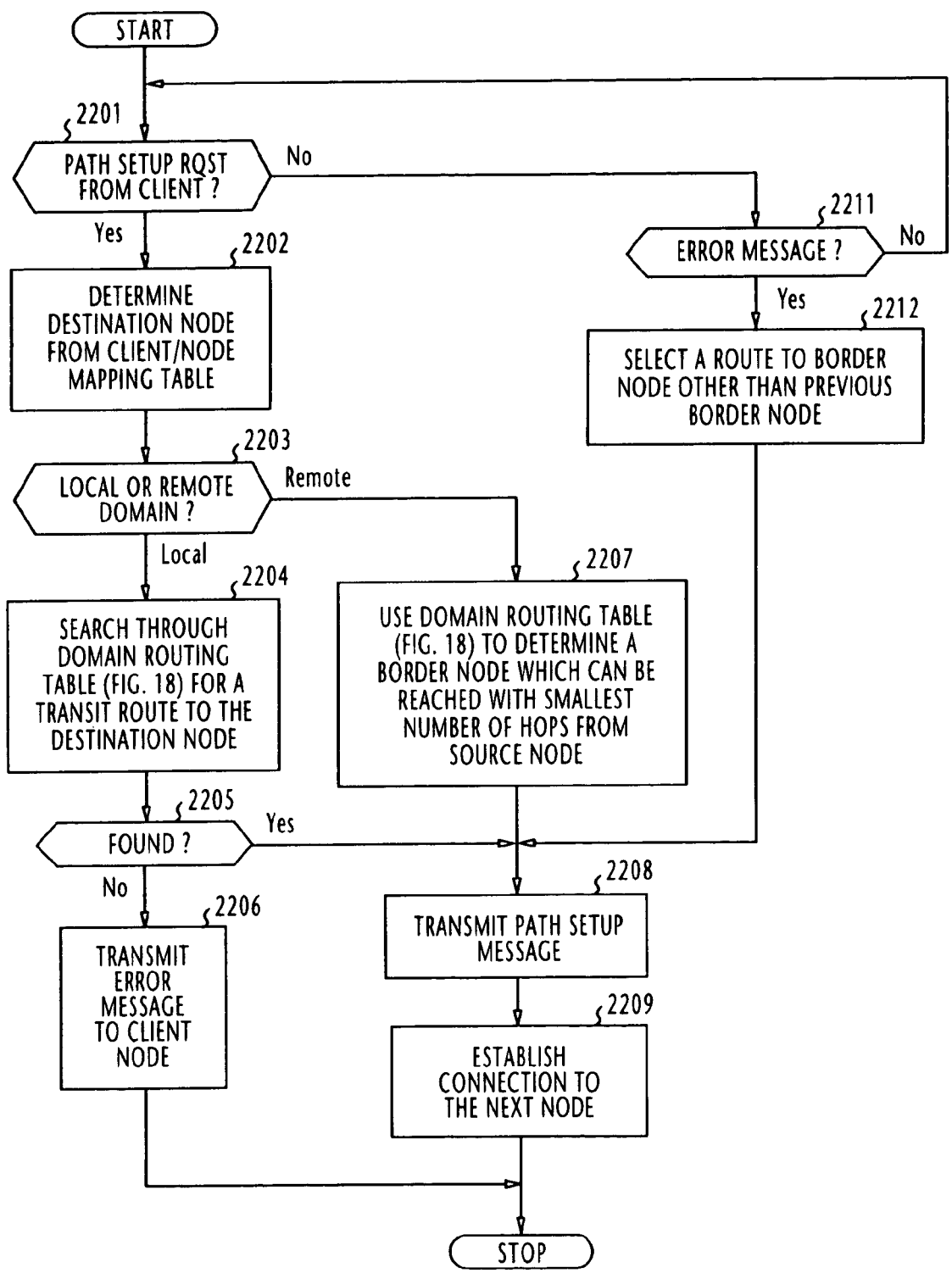
FIG. 22 is a flowchart of the operation of the domain routing processor of a source edge node when a path setup request is received from a client.
Figure 23:
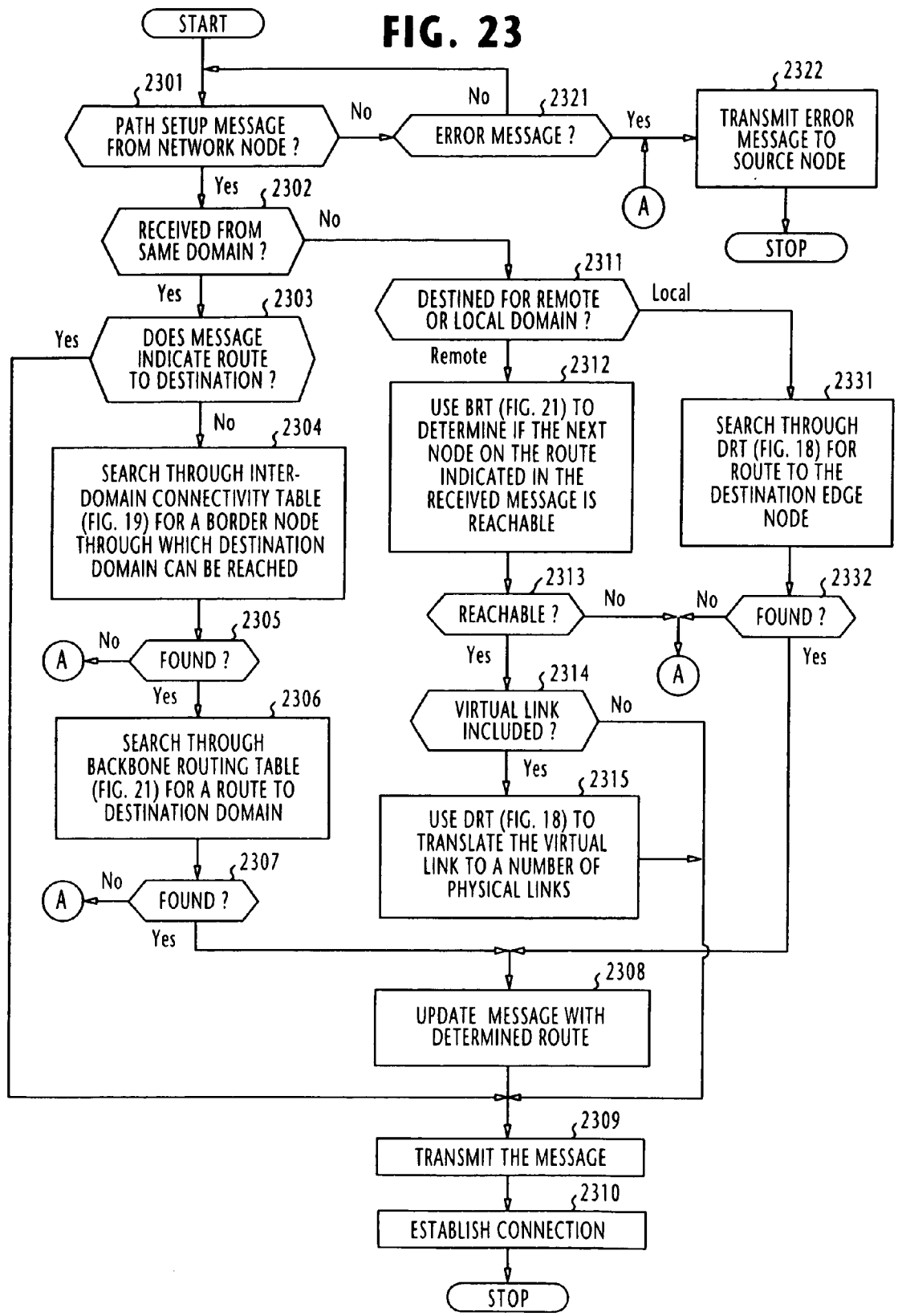
FIG. 23 is a flowchart of the operation of the domain and backbone routing processors of each node of the network when a path setup request is received from the source edge node.

FIGS. 22 and 23 are flowcharts according to which the routing processor 206 (including domain and backbone routing processors 206D, 206B) operates in response to a path setup request from a client node to perform a path finding procedure which is basically a trial-and-error approach. Therefore, if an intermediate node finds out that there is no reachable route to the destination, it returns an error message to the requesting client or a source edge node to repeat the process on an alternate route.

In FIG. 22, when a source edge node receives a path setup request from a client node (step 2201), the routing processor of the edge node determines, at step 2202, the destination edge node by checking the destination client contained in the request with a client/node mapping table, not shown. If the destination edge node is in the local domain of the source edge node (step 2203), flow proceeds to step 2204 to make a search through the domain routing table DRT (FIG. 18) for a route to the destination edge node. If such a route is not found (step 2205), flow proceeds to step 2206 to transmit an error message to the client node. If a route to the destination edge node is found in the domain routing table, the routing processor proceeds to step 2208 to transmit a path setup (control) message to the nearest node. At step 2209, the routing processor of source edge node instructs its optical switch to establish a connection to the node to which the path setup message has been transmitted.

If the destination edge node belongs to a remote domain (step 2203), flow proceeds to step 2207 to use the domain routing table (FIG. 18) to determine a border node which can be reached with a smallest number of hops as a nearest border node from the source edge node. Source edge node proceeds to steps 2208 and 2209 to transmit a path setup message designating the nearest border node and establish a connection thereto.

If the source edge node receives an error message from the interior of the network (step 2211), it selects the nearest route to a border node other than the previous nearest border node (step 2212) and proceeds to steps 2208 and 2209.

In FIG. 23, when the designated border node receives the path setup message (step 2301), it checks to see if the message is received from within the same domain. If this is the case, flow proceeds to step 2303 to determine if the message contains a route to the destination edge node. If so, the routing processor recognizes that the message has reached the destination domain and proceeds to step 2309 to transmit the message to the next node indicated in the message and establishes a connection to that node (step 2310).

If the message contains no route to the destination node, the decision at step 2303 is negative and flow proceeds to step 2304 to make a search through the border connectivity table (FIG. 19) for a border node through which the destination domain can be reached. If such a border node is found (step 2305), flow proceeds to step 2306 to make a further search through the backbone routing table BRT (FIG. 21) for a route to the destination domain. If a route to the destination domain is found (step 2307), the routing processor updates the message with the determined route at step 2308 and proceeds to step 2309 to transmit the message and establishes a connection to the next node (step 2310). If the decision at step 2305 or 2307 is negative, the routing processor transmits an error message to the source edge node (step 2322).

If the decision at step 2302 indicates that the path setup message has been received from the outside of the local domain, the routing processor proceeds to step 2311 to check to see if the message is destined for a remote domain or the local domain. If the message is destined for a remote domain, the routing processor uses the backbone routing table (FIG. 21) to determine if the next node on the route indicated in the message is reachable. If the next node is determined as being reachable at step 2313, a test is made at step 2314 for the presence of at least one virtual link in the route. If a virtual link is not included, flow proceeds to step 2309 for transmitting the message to the next node. Otherwise, the routing processor translates the virtual link(s) of the message to a number of physical links at step 2315 before executing step 2309. If a reachable node is found (step 2313), an error message sent to the source edge node (step 2322).

If the decision at step 2311 indicates that the received message is destined for the local domain, a search is made, at step 2331, through the domain routing table (FIG. 18) for a route to the destination edge node. If such a route is found (step 2332), the message is updated according to the discovered route at step 2308 and transmitted (step 2309). If such a route is not discovered, an error message is sent to the source edge node (step 2322).

Figure 24:
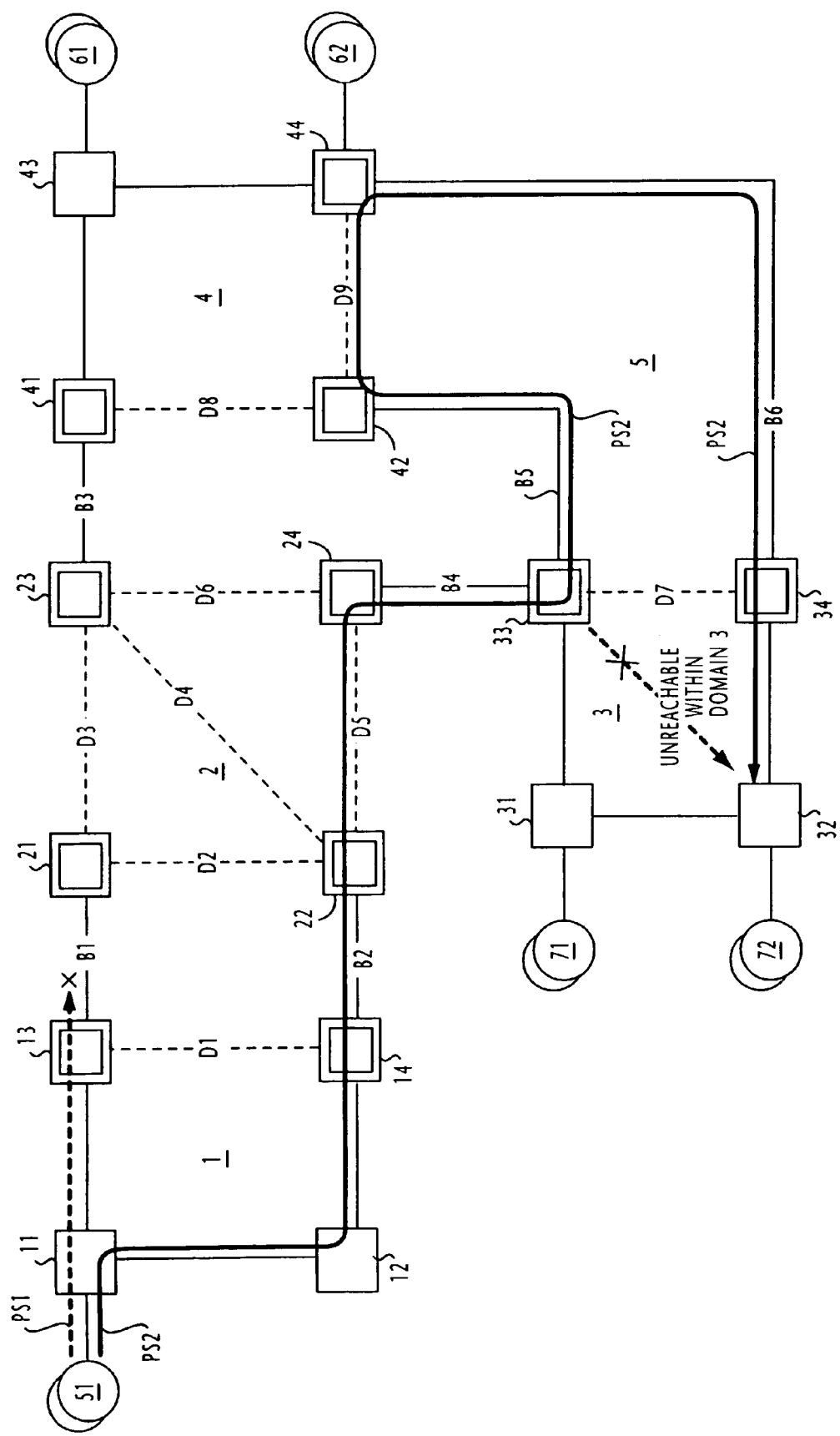
FIG. 24 is a block diagram of the network of the third embodiment in which path setup procedures are indicated by thick broken and thick solid lines.

For a full understanding of the present invention, it is appropriate to describe a path finding procedure with reference to FIGS. 22, 23 and 24 by assuming that the client node 51 has requested a path to the client node 72.

In response to the path setup request from client node 51, the edge node 11 examines its client/node mapping table (not shown) and recognizes that the node 32 is the destination edge node (step 2202) and proceeds to step 2203 to examine the domain routing table DRT11 (FIG. 18A) to check to see if the node 32 is in the local domain or a remote domain. Since the node 32 is a remote domain, the node 11 proceeds to step 2207 to use the domain routing table DRT11 to select the border node 13 as a nearest border node from the node 11 and transmits a path setup message to the node 13 (step 2208) and a connection is established from the node 11 to the node 13 (step 2209).

On receiving the path setup message from the node 11, the node 13 determines that it is received from within the same domain (step 2302). Since the message contains no route to the destination (step 2303), the node 13 proceeds to step 2304 to examine the border connectivity table BCT (FIG. 19) and determines that the destination edge node 32 can be reached via the border node 34. Thus, the decision at step 2305 is affirmative. At step 2306, the node 13 makes a search through the backbone routing table BRT13 (FIG. 21A) for a route to the border node 34. Since this table indicates that border node 34 is unreachable from the node 13, the decision at step 2307 is negative and an error message is sent to the source edge node 11 (step 2322).

As indicated in FIG. 24 by a dotted line PS1, the first path setup message from node 11 encounters a path-setup failure at the border node 13 and an error message is sent back from the node 13 to the node 11.

As a result, the source edge node 11 responds to the error message at step 2211 (FIG. 22) by selecting the border node 14 that can be reached via the node 12 (step 2212), transmits a path setup message to node 14 via node 12 (step 2208) and establishes a connection to the node 12 (step 2209).

On receiving the path setup message from the node 11, the node 14 determines that it is received from within the same domain (step 2302). Since the message contains no route to the destination (step 2303), the node 14 proceeds to step 2304 to examine the border connectivity table BCT (FIG. 19) and determines that the destination edge node 32 can be reached via the border node 34. Thus, the decision at step 2305 is affirmative. At step 2306, the node 14 makes a search through the backbone routing table BRT14 (FIG. 21B) for a route to the border node 34. Since the table BRT14 indicates that such a route is available between nodes 14 and 34, the decision at step 2307 is affirmative and the path setup message is updated with the route 14-22-24-33-42-44-34 found in the backbone routing table BRT14 (step 2308). The updated message is then transmitted over this route to the border node 34 (step 2309), while the node 14 establishes a connection to the node 22.

When the border node 34 receives the path setup message from the border node 14 (step 2301), flow proceeds through steps 2302 and 2311 to step 2331 to make a search through its domain routing table DRT34 (FIG. 18B) for a route to the destination edge node 32. Since the destination edge node 32 is reachable from the border node 34, the path setup message is updated with information of the detected route (step 2308) and transmitted to the node 32 (step 2309). As indicated by a thick line PS2 in FIG. 24, the path finding procedure for the second attempt is successful and a path from node 11 to node 32 is established.

Figure 25:
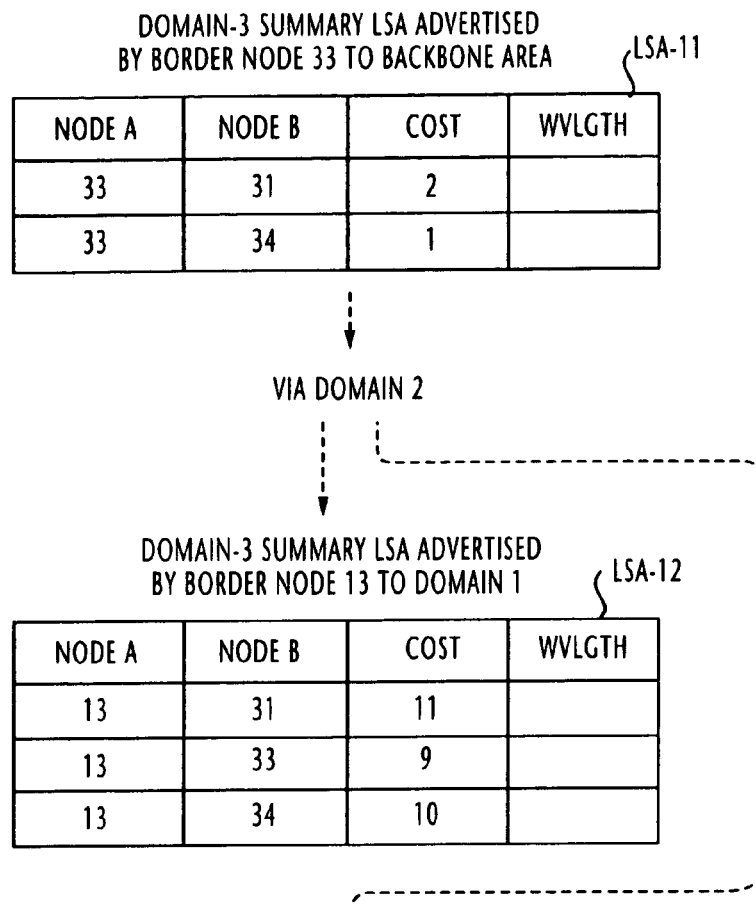
FIG. 25 is an illustration of a process of sending a summary link state advertisement message from a source domain through the network to a destination domain.

Instead of the border connectivity table (FIG. 19), summary link state advertisement messages can be used as shown in FIG. 25.

In FIG. 25, a summary LSA message LSA-11 of domain 3 is formulated in the border node 33 and advertised to the backbone area 5. The summary LSA-11 contains a description of node 33 mapped to nodes 31 and 34 with associated link costs and wavelength values. This message will be received by domain 2 and transmitted to the border nodes 13 and 14.

Border node 13 combines the summary LSA message received from the domain 2 with the link state information stored in the backbone link state database BLSD and performs route calculations on the combined LSA information to formulate a summary LSA-12 message. In this message the node 13 is mapped to nodes 31, 33 and 34, along with associated link costs and wavelength values.

Border node 14 combines the summary LSA message received from the domain 2 with the link state information stored in the backbone link state database BLSD and performs route calculations on the combined LSA information to formulate a summary LSA-13 message. In this message the node 14 is mapped to nodes 31, 32, 33 and 34, along with associated link costs and wavelength values.

Border nodes 13 and 14 advertise their summary LSA-12 and LSA-13 messages to every other node of the domain 1.

On receiving the summary LSA-13 message from the border node 14, the edge node 11 recognizes that it can reach the domain-3 node 32 via the border node 14. Therefore, it can be seen that connectivity between source and destination domains is automatically designed into the backbone routing table BRT of each network node and the border connectivity table BCT is not necessary when establishing a path.

In each network node, the backbone link state database BLSD are updated with the received summary LSA message.

Figure 26:
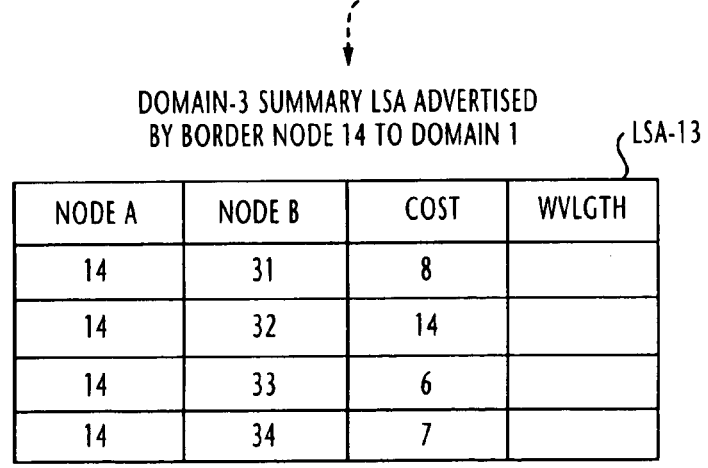
FIG. 26 is an illustration of a modified summary link state of a source domain.

The summary link state message can be simplified as shown in FIG. 26, which indicates a summary LSA-14 message of domain 3 advertised from the border node 33 to the backbone area. In this summary LSA message, the border node 33 is mapped to nodes 31 and 34 and a maximum value of link costs is indicated, instead of individual values of link cost. As a result, the amount of link state information to be advertised from one node to the next can be significantly reduced.

What is claimed is:

1. A communications network comprising:
   a plurality of network nodes interconnected by communication links, said network nodes being organized into a plurality of groups corresponding to geographic domains, ones of said network nodes located at a periphery of the network functioning as edge nodes to which user terminals are connected;
   a plurality of domain connectivity tables respectively associated with said domains, each of the domain connectivity tables indicating an unavailability of intra-domain connectivity of the associated domain; and
   a plurality of domain routing tables respectively associated with said domains, each of the domain routing tables indicating a route specifying ones of said network nodes whose intra-domain connectivity is indicated in the domain connectivity table of the associated domain, the routing table of each of the associated domains including a plurality of parallel routes between said source and destination terminals, each of said plurality of parallel routes repeatedly passing through the associated domain,
   said network nodes using said plurality of routing tables for establishing a path between said edge nodes in response to a path setup request from said user terminals by selecting one of said parallel routes having a smallest number of transit domains and discarding the parallel routes other than the selected route from the routing table.

2. The communications network of claim 1, wherein the network nodes of each domain advertise contents of the domain routing table of the domain to the network nodes of a downstream neighbor domain and create the domain routing table of the domain in accordance with advertised contents of the domain routing table of an upstream neighbor domain.

3. The communications network of claim 2, wherein the network nodes of each of said domains update the domain routing table of the domain in accordance with the advertised contents of the domain routing table of said upstream neighbor domain.

4. The communications network of claim 1, wherein each of said network nodes comprises an optical cross-connect system for establishing transparent optical connections between neighboring network nodes.

5. The communications network of claim 1, wherein ones of said network nodes located at border points between neighbor domains of said plurality of domains function as border nodes, further comprising:
   a plurality of inter-domain connectivity tables respectively associated with said domains, each of the inter-domain connectivity tables indicating inter-domain connectivity between the network nodes of the associated domain and the border nodes of a neighbor domain,
   each of said domain routing tables indicating a route specifying ones of said network nodes whose inter-domain connectivity is indicated in the inter-domain connectivity table of the associated domain,
   each of said network nodes additionally using the inter-domain connectivity table of the associated domain when creating the domain routing table of the associated domain.

6. The communications network of claim 1, wherein each of said domain connectivity tables and each of said routing tables are provided in each of the network nodes.

7. The communications network of claim 5, wherein each of said inter-domain connectivity tables is provided in each of the network nodes.

8. A cross-connect node for a communications network in which said node comprises one of a plurality of network nodes, said network nodes being organized into a plurality of groups corresponding to geographic domains, ones of said network nodes located at a periphery of the network functioning as edge nodes to which user terminals are connected, said cross-connect node comprising:
   a domain connectivity table for indicating an unavailability of an intra-domain connectivity of the domain of said cross-connect node;
   a domain routing table for indicating a route specifying ones of said network nodes whose intra-domain connectivity is indicated in said domain connectivity table, the domain routing table including a plurality of parallel routes between said source and destination terminals, each of said plurality of parallel routes repeatedly passing through the domain of the cross-connect node; and
   a processor for using said domain routing table for establishing a path between said edge nodes in response to a path setup request from said user terminals by selecting one of said parallel routes having a smallest number of transit domains and discarding the parallel routes other than the selected route from the routing table.

9. The cross-connect node of claim 8, wherein said processor advertises contents of the domain routing table to the network nodes of a downstream neighbor domain and creates the routing table in accordance with advertised contents of the routing table of an upstream neighbor domain.

10. The cross-connect node of claim 9, wherein said processor updates the domain routing table in accordance with the advertised contents of the domain routing table of said upstream neighbor domain.

11. The cross-connect node of claim 8, further comprising an optical cross-connect system for establishing transparent optical connections between neighboring network nodes.

12. The cross-connect node of claim 8, wherein ones of said network nodes located at border points between neighbor domains of said plurality of domains function as border nodes, further comprising:
   an inter-domain connectivity table for indicating inter-domain connectivity between the network nodes of the associated domain and the border nodes of a neighbor domain,
   said domain routing table indicating a route specifying ones of said network nodes whose inter-domain connectivity is indicated in the inter-domain connectivity table, said processor using the inter-domain connectivity table when creating said domain routing table.

13. An operating method for a communications network, wherein the network comprises a plurality of network nodes being organized into a plurality of groups corresponding to geographic domains, ones of said network nodes located at a periphery of the network functioning as edge nodes and a plurality of user terminals connected to said edge nodes, the method comprising:

creating a domain connectivity table for indicating an unavailability of an intra-domain connectivity of an associated one of said plurality of domains;

creating a domain routing table for indicating a route specifying ones of said network nodes whose intra-domain connectivity is indicated in said domain connectivity table, the domain routing table including a plurality of parallel routes between said source and destination terminals, each of said plurality of parallel routes repeatedly passing through the domain of the cross-connect node;

advertising contents of the domain routing table to the network nodes of a downstream neighbor domain;

updating the domain routing table in accordance with advertised contents of the routing table of an upstream neighbor domain; and using said domain routing table for establishing a path between said edge nodes in response to a path setup request from said user terminals by selecting one of said parallel routes having a smallest number of transit domains and discarding the parallel routes other than the selected route from the domain routing table.

14. The method of claim 13, wherein ones of said network nodes located at border points between neighbor domains of said plurality of domains function as border nodes, further comprising steps of:

creating an inter-domain connectivity table for indicating an inter-domain connectivity between the network nodes of the associated domain and the border nodes of a neighbor domain; and updating said domain routing table for indicating that said route specifies ones of said network nodes whose inter-domain connectivity is indicated in the inter-domain connectivity table.

15. A communications network comprising:

a plurality of network nodes organized into a plurality of groups corresponding to geographic domains, ones of said network nodes located at a periphery of the network functioning as edge nodes to which user terminals are connected, and ones of said network nodes located at border points between neighbor domains of said plurality of domains functioning as border nodes, the border nodes of same domain being interconnected by intra-domain virtual links and the border nodes of different domains being interconnected by inter-domain physical links;

a plurality of domain routing tables respectively associated with said domains, each of the domain routing tables indicating a plurality of routes containing no intra-domain virtual link terminating at said edge nodes and no consecutively concatenated intra-domain virtual links, each of the domain routing tables including a plurality of parallel routes between said source and destination terminals, each of said plurality of parallel routes repeatedly passing through the associated domain; and a backbone routing table for indicating a plurality of inter-domain routes and unreachability indications between the border nodes of each domain and the border nodes of every other domain, said inter-domain routes containing at least one of said inter-domain physical links but containing no consecutively concatenated intra-domain virtual links, said network nodes using said domain routing tables and said backbone routing table for establishing a path between said edge nodes in response to a path setup request from said user terminals by selecting one of said parallel routes having a smallest number of transit domains and discarding the parallel routes other than the selected route from the domain routing table.

16. The communications network of claim 15, further comprising a border connectivity table for indicating intra-domain connectivity of said border nodes within each of said domains, said network nodes additionally using said border connectivity table for establishing said path.

17. The communications network of claim 15, wherein each of said network nodes comprises an optical cross-connect system for establishing transparent optical connections between neighboring network nodes.

18. The communications network of claim 15, wherein said network nodes are responsive to a failure in establishing said path for using said domain routing tables and said backbone routing table again and reestablishing a path between said edge nodes by avoiding a previously selected route.

19. The communications network of claim 15, further comprising a backbone link state database for storing link state information mapping said intra-domain virtual links to ones of said border nodes and mapping said inter-domain physical links to ones of said border nodes, wherein a border node of a domain advertises summary link state information of the domain to a neighbor domain, and wherein the border node is responsive to summary link state information received from a neighbor domain for combining the advertised summary link state information with link state information stored in the backbone link state database, performing calculations on the combined information to formulate new summary link state information, updating said backbone link state database with the new summary link state information and advertising the new summary link state information to a neighbor domain.

20. The communications network of claim 19, wherein said summary link state information contains a maximum value of costs of links said domain.

21. A cross-connect node for a communications network in which said node comprises one of a plurality of network nodes, said network nodes being organized into a plurality of groups corresponding to geographic domains, ones of said network nodes located at a periphery of the network functioning as edge nodes to which user terminals are connected, and ones of said network nodes located at border points between neighbor domains of said plurality of domains functioning as border nodes, the border nodes of a same domain being interconnected by intra-domain virtual links and the border nodes of different domains being interconnected by inter-domain physical links;

a domain routing table for indicating a plurality of routes containing no intra-domain virtual link terminating at said edge nodes and no consecutively concatenated intra-domain virtual links, the domain routing table including a plurality of parallel routes between said source and destination terminals, each of said plurality of parallel routes repeatedly passing through the associated domain;

a backbone routing table for indicating a plurality of inter-domain routes and unreachability indications between the border nodes of each domain and the border nodes of every other domain, said inter-domain routes containing at least one of the inter-domain physical links but containing no consecutively concatenated intra-domain virtual links; and a processor for using said domain routing table and said backbone muting table for establishing a path between said edge nodes in response to a path setup request from said user terminals by selecting one of said parallel routes having a smallest number of transit domains and discarding the parallel routes other than the selected route from the domain routing table.

22. The cross-connect node of claim 21, further comprising a border connectivity table for indicating art intra-domain connectivity of said border nodes within each of said domains, said processor additionally using said border connectivity table for establishing said path.

23. The cross-connect node of claim 21, further comprising an optical cross-connect system for establishing transparent optical connections between neighboring network nodes.

24. The cross-connect node of claim 21, wherein said processor responds to a failure in establishing said path for using said domain routing tables and said backbone routing table again and reestablishing a path between said edge nodes by avoiding a previously selected route.

25. The cross-connect node of claim 21, further comprising a backbone link state database for storing link state information mapping said intra-domain virtual links to ones of said border nodes and mapping said inter-domain physical links to ones of said border nodes, wherein said processor advertises summary link state information of a domain to a neighbor domain, and wherein said processor is responsive to summary link state information received from a neighbor domain for combining the advertised summary link state information with link state information stored in the backbone link state database, performing calculations on the combined information to formulate new summary link slate information, updating said backbone link state database with the new summary link state information and advertising the new summary link state information to a neighbor domain.

26. The cross-connect node of claim 25, wherein said summary link state information contains a maximum value of costs of links said domain.

27. An operating method for a communications network which comprises a plurality of network nodes organized into a plurality of groups corresponding to geographic domains, ones of said network nodes located at a periphery of the network functioning as edge nodes to which user terminals are connected, and ones of said network nodes located at border points between neighbor domains of said plurality of domains functioning as border nodes, the border nodes of a same domain being interconnected by intra-domain virtual links and the border nodes of different domains being interconnected by inter-domain physical links, the method comprising:

creating a plurality of domain routing tables respectively associated with said domains, each of the domain routing tables indicating a plurality of routes containing no intra-domain virtual link terminating at said edge nodes and no consecutively concatenated intra-domain virtual links, each of said domain routing tables including a plurality of parallel routes between said source and destination terminals, each of said plurality of parallel routes repeatedly passing through the associated domain;

creating a backbone routing table for indicating a plurality of inter-domain routes and unreachability indications between the border nodes of each domain and the border nodes of every other domain, said inter-domain routes containing at least one inter-domain physical link but containing no consecutively concatenated intra-domain virtual links; and using said domain routing tables and said backbone routing table for establishing a path between said edge nodes in response to a path setup request from said user terminals by selecting one of said parallel routes having a smallest number of transit domains, and discarding the parallel routes other than the selected route from the domain routing table.

28. The method of claim 27, further comprising:

creating a border connectivity table for indicating an intra-domain connectivity of said border nodes within each of said domains, additionally using said border connectivity table for establishing said path.

29. The method of claim 27, further comprising:

responsive to a failure in establishing said path, using said domain routing tables and said backbone routing table again; and reestablishing a path between said edge nodes by avoiding a previously selected route.

30. The method of claim 27, further comprising:

advertising summary link state information of a domain to a neighbor domain;

combining summary link state information advertised from a neighbor domain with link state information which maps, in a backbone link state database, said intra-domain virtual links to ones of said border nodes and said inter-domain physical links to ones of said border nodes, performing calculation on the combined information to formulate new summary link state information;

updating said backbone link state database with the new summary link state information; and advertising the new summary link state information to a neighbor domain.

31. The method of claim 30, wherein said summary link state information contains a maximum value of costs of links of said domain.

32. The communication network of claim 1, wherein said domain connectivity tables indicate both an availability and an unavailability of said intra-domain connectivity of the associated domain.

33. The cross-connect node of claim 8, wherein said domain connectivity table indicates both an availability and an unavailability of said intra-domain connectivity of the associated domain.

34. The operating method of claim 13, wherein said domain connectivity table indicates both an availability and an unavailability of said intra-domain connectivity of the associated domain.

* * * * *